(12) United States Patent
Shimomura

(10) Patent No.: US 6,203,477 B1
(45) Date of Patent: Mar. 20, 2001

(54) CUTTER CHANGING SYSTEMS AND METHODS FOR INTERNAL CRANKSHAFT MILLER

(75) Inventor: Masumi Shimomura, Ishikawa (JP)

(73) Assignee: Komatsu Machinery Corporation, Ishikawa (JP)

(*) Notice: Subject to any disclaimer, the term of this patent is extended or adjusted under 35 U.S.C. 154(b) by 0 days.

(21) Appl. No.: 09/413,882

(22) Filed: Oct. 7, 1999

(30) Foreign Application Priority Data

Oct. 12, 1998 (JP) .................................................. 10-289180
Oct. 22, 1998 (JP) .................................................. 10-300689

(51) Int. Cl.[7] ............................ B23Q 3/157; B23B 5/18; B23C 3/06
(52) U.S. Cl. .................................. 483/1; 483/31; 409/200
(58) Field of Search ..................................... 483/1, 30, 31, 483/34, 35; 409/200, 199, 234

(56) References Cited

U.S. PATENT DOCUMENTS

| 4,020,545 | * | 5/1977 | Slavinski et al. | 483/1 |
|---|---|---|---|---|
| 4,065,845 | * | 1/1978 | Strom et al. | 483/31 |
| 4,581,811 | * | 4/1986 | Eckle | 483/31 |
| 4,679,973 | * | 7/1987 | Kodama et al. | 409/200 |
| 4,768,282 | * | 9/1988 | Rieck et al. | 409/234 |
| 4,850,765 | * | 7/1989 | Ramunas | 409/234 |
| 5,226,869 | * | 7/1993 | Thumm | 483/1 |
| 6,102,838 | * | 8/2000 | Assie | 483/1 |

FOREIGN PATENT DOCUMENTS

| 3404497 | * | 8/1985 | (DE) | 483/35 |
|---|---|---|---|---|
| 6-5816 |   | 1/1994 | (JP) . |   |
| 8-118125 |   | 5/1994 | (JP) . |   |

* cited by examiner

Primary Examiner—A. L. Wellington
Assistant Examiner—Erica Ergenbright
(74) Attorney, Agent, or Firm—Ronald P. Kananen; Rader, Fishman & Grauer

(57) ABSTRACT

A cutter changing system and a method of its operation are disclosed for a crankshaft fabricating miller of internal type in which a cutter body having tips attached thereto along an inner peripheral surface thereof is fitted with and fixed to a cutter adapter so as to be rotatable together with the cutter adapter, thereby permitting a workpiece to be machined therewith by milling to fabricate a crankshaft.

18 Claims, 21 Drawing Sheets

F I G. 12
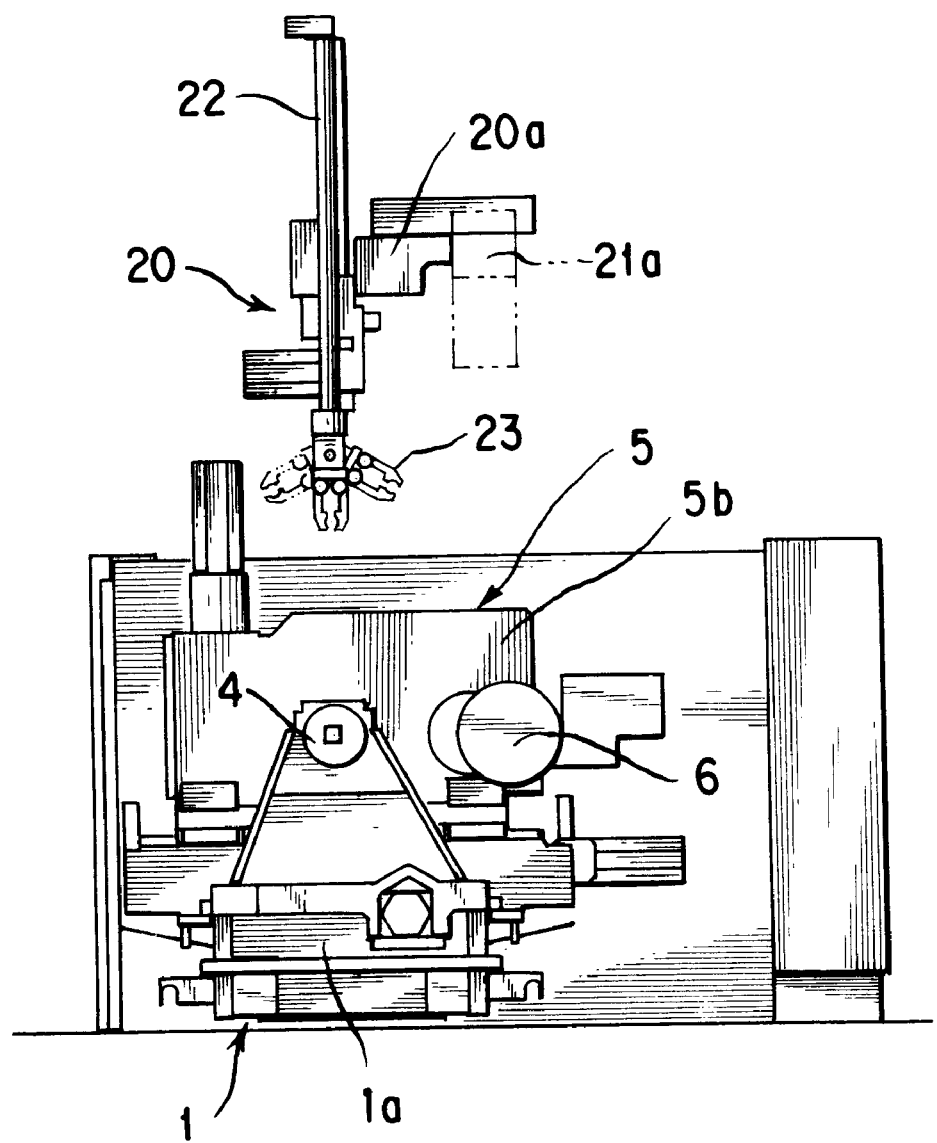

CUTTER CHANGING SYSTEMS AND METHODS FOR INTERNAL CRANKSHAFT MILLER

TECHNICAL FIELD

The present invention relates to cutter changing systems and methods for an internal crankshaft miller, i. e., a miller of internal type for fabricating crankshafts.

BACKGROUND ART

Internal crankshaft millers, or millers of internal type for fabricating crankshafts make use of an inside edge cutter having a plurality of tips or cutting edges attached thereto along its inner peripheral surface, and cutter changing systems or apparatuses for use with such millers have been known as disclosed, e. g., in patent literature JA P 8-118125 A and JA U 6-5816 A.

JA P 8-118125 A describes a cutter mounting apparatus having a construction in which two or more splines are arranged circumferentially spaced apart and equi-distantly along the outer periphery of a pin forming miller cutter corresponding to the splines, spline slots are formed along the inner periphery of an adapter. The splines and the spline slots to be fitted together are tapered to become gradually narrower in the forward direction in which the cutter is inserted into the adapter. Such a construction is described to prevent a thermal expansion from making the fit tight and a tilt of the cutter pulled out from causing the fit to misfit, and thus to have the advantage of permitting the pin forming miller cutter to be centered with precision and yet to be mounted and dismounted with ease.

JA U 6-5816 A describes a cutter mounting apparatus in which a cutter body has a key slot formed therein that is tapered with respect to a longitudinal axis of the cutter body to accept and fit with a cutter adapter key. It is taught that the arrangement permitting the cutter body if thermally expanded to be readily removed from the cutter adapter is thus capable of effecting a cutter changing operation in a short period of time and with ease.

Inconveniently, however, both the cutter mounting apparatuses described above require that a cutter body upon being mounted on the cutter adapter be fixed to the cutter adapter with a plurality of clamping bolts fastened to both the cutter body and the cutter adapter.

In removing the cutter body from the cutter adapter, this also requires that these clamping bolts be loosened and detached to release the cutter body from the cutter adapter.

The prior art is found inconvenient in that it entails a time consuming operation in loading and unloading a cutter body and is hence inefficient. Further, the cutter mounting method with a plurality of clamping both described above is a big factor in holding back an automatization of the cutter changing.

DISCLOSURE OF THE INVENTION

Developed with the above mentioned inconvenience in the prior art taken into account, the present invention has for an object thereof to provide a cutter changing system and method for a crankshaft fabricating miller of internal type that permits a cutter change to be effected quickly and with ease, thereby enhancing both the operating efficiency and the productivity of fabricating crankshafts.

In order to achieve this and other objects which will become more readily apparent hereinafter, the present invention provides in a first form of implementation thereof a cutter changing system for a crankshaft fabricating miller of internal type in which a cutter body having tips attached thereto along an inner peripheral surface thereof is fitted with and fixed to a cutter adapter so as to be rotatable together with the cutter adapter, thereby permitting a workpiece to be machined therewith by milling to fabricate a crankshaft, which cutter changing system comprises: at least one portion of recess formed in an outer peripheral portion of the said cutter body; at least one clamping means including: a pawl member disposed in the said cutter adapter so as to be movable in a radial direction thereof to set its forward end for motion to protrude and withdraw from an inner peripheral surface of the said cutter adapter, the said pawl member having an inclined engagement surface and an inclined guide surface formed both on the said forward end of the pawl member and located respectively at a fore and a rear portion thereof in a direction in which the said cutter body is fitted as aforesaid, and a means for biasing the said pawl member in a direction of its motion to project; and at least one pawl retracting means operable when the said cutter body is fitted into the said cutter adapter and adapted to be then inserted into said portion of recess to come into a pressure contact with the inclined guide surface of the said pawl member for permitting the said pawl member to be retracted against the said means for biasing, whereby fitting the said cutter body together with the said pawl retracting means into the said cutter adapter causes the said pawl retracting means combined with the outer peripheral portion of the said cutter body to retract the said pawl member and thereafter extracting the said pawl retracting means causes the said pawl member to project into the said portion of recess and thereby to permit clamping the said cutter body onto the said cutter adapter with the said inclined engagement surface, and inserting the said pawl retracting means into the said portion of recess causes the said pawl member to be retracted to release the said clamping and thereby to permit the said cutter body to be removed together with the said pawl retracting means from the said cutter adapter.

The construction mentioned above that permits fitting a cutter body into a cutter adapter mounted onto a cutter drum to press the cutter body into the cutter adapter to cause an inclined guide surface formed on the forward end of a pawl member to be pressed by the cutter body to recede the pawl member forward end, does allow the cutter body to be mounted onto the cutter adapter with ease while permitting both cutter mounting and dismounting operations to be accomplished more quickly and efficiently than could have been done by the prior art that requires the use of a plurality of bolts both when a cutter body is to be mounted and dismounted.

Because both cutter mounting and dismounting operations can be performed quickly, the operating efficiency of a crankshaft fabricating miller is enhanced, thus enhancing the productivity of fabricating crankshaft products as well.

In order to achieve its objects, the present invention also provides in a second form of implementation thereof a construction as described above which further comprises a raised annular cutter seat formed on an inner peripheral surface of the said cutter adapter and an annular indented portion formed on an outer peripheral surface of the said cutter body and adapted to come into engagement with the said raised annular cutter accepting seat.

The specific construction mentioned above that permits clamping a cutter body firmly between a cutter accepting seat formed in the cutter adapter and an inclined surface of engagement formed on the pawl member prevents the cutter body from vibrating in the course of milling a workpiece or the tips from developing a chatter mark, thereby permitting milling of the workpiece with an increased accuracy.

In order to achieve its objects, the present invention also provides in a third form of implementation thereof a construction which further comprises a first tapered spline formed in an inner peripheral surface of the said cutter adapter and a second tapered spline formed in an outer peripheral surface of the said cutter body and adapted to come into engagement with the said first tapered spline.

The specific construction mentioned above which permits a cutter adapter and a cutter body to be firmly coupled together does prevent the cutter body from vibrating in the course of milling a workpiece or the tips from developing a chatter mark, thereby permitting milling of the workpiece with an increased accuracy.

In order to achieve its objects, the present invention also provides in a fourth form of implementation thereof a construction which further comprises a cutter unit having the said cutter adapter mounted thereto so as to be rotatable for indexing; an arm disposed in the vicinity of the said miller capable of being swung or rocked in directions in which the said cutter body is loaded and unloaded; and a cutter holder means disposed on a lower end of the said arm for holding the said cutter body detachably, the said cutter holder means including a positioning means for positioning the said cutter body and further including the said pawl retracting means.

The specific construction mentioned above which not only permits a cutter changing operation to be accomplished quickly and efficiently with the result of an increased productivity of fabricating crankshafts, but also provides mounting a cutter body onto a cutter holder means that exists on a rocking arm to effect an automatic mounting and dismounting of the cutter body, does largely relieve a fatigue imposed on an operator as compared with the prior art in which the cutter body must be mounted and dismounted as held and supported by the operator oneself.

In order to achieve its objects, the present invention also provides in a fifth form of implementation thereof a construction as described above in which the miller includes an automatic loader for loading and unloading a workpiece onto and out of it, the cutter changing system further comprising: a cutter unit having the said cutter adapter mounted thereto so as to be rotatable for indexing; and a cutter holder means mounted to the said automatic loader so as to be movable upwards and downwards for holding the said cutter body detachably, the said cutter holder means including a positioning means for positioning the said cutter body and further including the said pawl retracting means.

The specific construction mentioned above which not only permits a cutter changing operation to be accomplished quickly and efficiently with the result of an increased productivity of fabricating crankshafts, but provides mounting a cutter body onto a cutter holder means that exists on an automatic loader to effect an automatic mounting and dismounting of the cutter body, does largely relieve a fatigue imposed on an operator as compared with the prior art in which the cutter body must be mounted and dismounted as held and supported by the operator oneself.

Also, the utilization of an automatic loader that loads and unloads a workpiece into and out of the miller machine to effect both a cutter carrying in and out operation and a cutter changing operation and permits controlling the operation of the cutter changing system by utilizing a control system for the automatic leader, thereby makes it unnecessary to provide a separate control system for the cutter changing operation and thus permits a cutter changing system according to the present invention to be furnished at a reasonable cost.

In the construction mentioned above, the said cutter holder means may include a clamping shaft to be clamped by a chuck in the said miller.

In order to achieve its objects, the present invention also provides in a sixth form of implementation thereof a construction as mentioned above which further comprises a cutter unit having the said cutter adapter mounted thereto so as to be rotatable for indexing; and a cutter changing jig for holding the said cutter body detachably, the said cutter changing jig including at least a pair of support means for supporting the said cutter body and further including the said pawl retracting means as is positioned in the vicinity of the said support means.

The specific construction mentioned above that permits mounting a cutter body onto a cutter changing jig and then with the cutter adapter and the cutter body positioned relative to each other pressing the cutter body into the cutter adapter to cause the pawl member to be retracted, does permit the cutter body to be mounted onto the cutter adapter with ease.

Also, the same construction that permits removing the cutter changing jig from the cutter body mounted onto the cutter adapter to clamp the cutter body with the pawl member of the clamping means, does permit the cutter body to be mounted onto the cutter adapter without fail.

In the construction mentioned above, the said cutter changing jig may further include a force augmenting means positioned in the vicinity of the said support means.

In order to achieve its objects, the present invention also provides in a seventh form of implementation thereof a cutter changing method for a crankshaft miller of internal type in which a cutter body having tips attached thereto along an inner peripheral surface thereof is fitted with and fixed to a cutter adapter so as to be rotatable together with the cutter adapter, thereby permitting a workpiece to be machined therewith by milling to fabricate a crankshaft, which cutter changing method comprises the steps of: providing the said cutter adapter with a clamping means for clamping a cutter body detachably; providing in the vicinity of the said miller a cutter changing apparatus that includes a cutter holder means for detachably holding a cutter body for replacement with; holding with the said cutter holder means a said cutter body for replacement with; transferring with the said cutter changing apparatus the said cutter body for replacement with on the said cutter holder means to a cutter changing position; then, pushing the said transferred cutter body into the said cutter adapter and mounting the said cutter body onto the said cutter adapter with the said clamping means to complete loading the said cutter body onto the said cutter adapter; and in unloading the said cutter body from the said cutter adapter, dismounting the said cutter body from the said cutter adapter by effecting the preceding mounting steps of operation in a reversed manner.

In order to achieve its objects, the present invention also provides in an eighth form of implementation thereof a cutter changing method for a crankshaft miller of internal type in which a cutter body having tips attached thereto along an inner peripheral surface thereof is fitted with and fixed to a cutter adapter so as to be rotatable together with the cutter adapter, thereby permitting a workpiece to be machined therewith by milling to fabricate a crankshaft, which cutter changing method comprises the steps of: providing the said cutter adapter with a clamping means for clamping a cutter body detachably; providing an automatic loader that loads and unloads a workpiece onto and out of the said miller with a cutter holder means for detachably holding a cutter body for replacement with; holding with the said cutter holder means a said cutter body for replacement with; transferring with the said automatic loader the said cutter body for replacement with on the said cutter holder means to a cutter changing position; pushing the said transferred cutter body into said cutter adapter and mounting said cutter body onto said cutter adapter with said clamping means to complete loading said cutter body on said cutter adapter; and in unloading the said cutter body from the said cutter adapter, dismounting the said cutter body from the said cutter adapter by effecting the preceding mounting steps of operation in a reversed manner.

Both the methods mentioned above permit a cutter changing operation to be accomplished quickly and efficiently and hence improve the productivity of fabricating crankshaft products. Also, simply pressing a cutter body transfered to the cutter changing position into the cutter adapter causes a clamping means provided on the cutter adapter side to clamp the cutter body and hence does permit the cutter body to be clamped without fail.

Both the methods mentioned above may further include the steps of providing the said cutter holder means with a clamping shaft that protrudes therefrom; and clamping the said clamping shaft with a chuck in the said miller while transferring the said cutter adapter to a region of the said cutter body held on the said cutter holder means to permit the said cutter body to be mounted to and dismounted from the said cutter adapter in the said region.

If a rocking arm in the cutter changing apparatus and an elevating arm in the automatic loader are each less rigid, such methods as mentioned above do permit clamping the clamping shaft for a cutter holder means with a chuck to prevent the cutter holder means from rocking unstably and hence allow a cutter mounting (loading) and a cutter dismounting (unloading) operation to be both performed with ease and without fail.

In order to achieve its objects, the present invention also provides in a ninth form of implementation thereof a cutter changing system for a crankshaft fabricating miller of internal type in which a cutter body having tips attached thereto along an inner peripheral surface thereof is fitted with and fixed to a cutter adapter so as to be rotatable together with the cutter adapter, thereby permitting a workpiece to be machined therewith by milling to fabricate a crankshaft, which cutter changing system comprises: at least one portion of recess formed in an outer peripheral portion of the said cutter body; at least one clamping means including: a pawl member disposed in the said cutter adapter so as to be movable in a radial direction thereof to set its forward end for motion to protrude and withdraw from an inner peripheral surface of the said cutter adapter, the said pawl member having an inclined engagement surface and an inclined guide surface formed both on the said forward end of the pawl member and located respectively at a fore and a rear portion thereof in a direction in which the said cutter body is fitted as aforesaid, and a means for biasing the said pawl member in a direction of its motion to project; and at least one pawl retracting means operable when the said cutter body is fitted into the said cutter adapter and adapted to be then inserted into the said portion of recess to come into a pressure contact with the inclined guide surface of the said pawl member for permitting the said pawl member to be retracted against the said means for biasing, whereby fitting the said cutter body into the said cutter adapter causes the outer peripheral portion of the said cutter body to retract the said pawl member and thereafter causes the said pawl member to project into the said portion of recess and thereby to permit clamping the said cutter body onto the said cutter adapter with said inclined engagement surface, and inserting the said pawl retracting means into the said portion of recess causes the said pawl member to be retracted to the release said clamping and thereby to permit the said cutter body to be removed together with the said pawl retracting means from said cutter adapter.

In order to achieve its objects, the present invention also provides in a tenth form of implementation thereof a cutter changing system for a crankshaft fabricating miller of internal type in which a cutter body having tips attached thereto along an inner peripheral surface thereof is fitted with and fixed to a cutter adapter so as to be rotatable together with the cutter adapter, thereby permitting a workpiece to be machined therewith by milling to fabricate a crankshaft, which cutter changing system comprises: at least one portion of recess formed in an outer peripheral portion of the said cutter body; and at least one clamping means including: a pawl member disposed in the said cutter adapter so as to be movable in a radial direction thereof to set its forward end for motion to protrude and withdraw from an inner peripheral surface of the said cutter adapter, the said pawl member having an inclined engagement surface and an inclined guide surface formed both on the said forward end of the pawl member and located respectively at a fore and a rear portion thereof in a direction in which the said cutter body is fitted as aforesaid, and a means for biasing the said pawl member in a direction of its motion to project, whereby fitting the said cutter body into the said cutter adapter causes the outer peripheral portion of the said cutter body to retract the said pawl member and thereafter causes the said pawl member to project into the said portion of recess and thereby to permit clamping the said cutter body onto the said cutter adapter with said inclined engagement surface.

These and other features, objects and advantages of the present invention will become more readily apparent to those of ordinary skill in the art from the following detailed description of the preferred embodiments thereof as illustrated in the various drawing figures.

BRIEF DESCRIPTION OF THE DRAWINGS

In the accompanying drawings:

FIG. 12 is a side view of the miller as seen in the direction indicated by the arrow XII in FIG. 11;

BEST MODES FOR CARRYING OUT THE INVENTION

Hereinafter, suitable embodiments of the present invention implemented with respect to a cutter changing system and method are set out with reference to the accompanying drawings hereof.

Referring to FIGS. 1 through 9, an elucidation will now be given of a first form of embodiment of the present invention.

Figure 1:
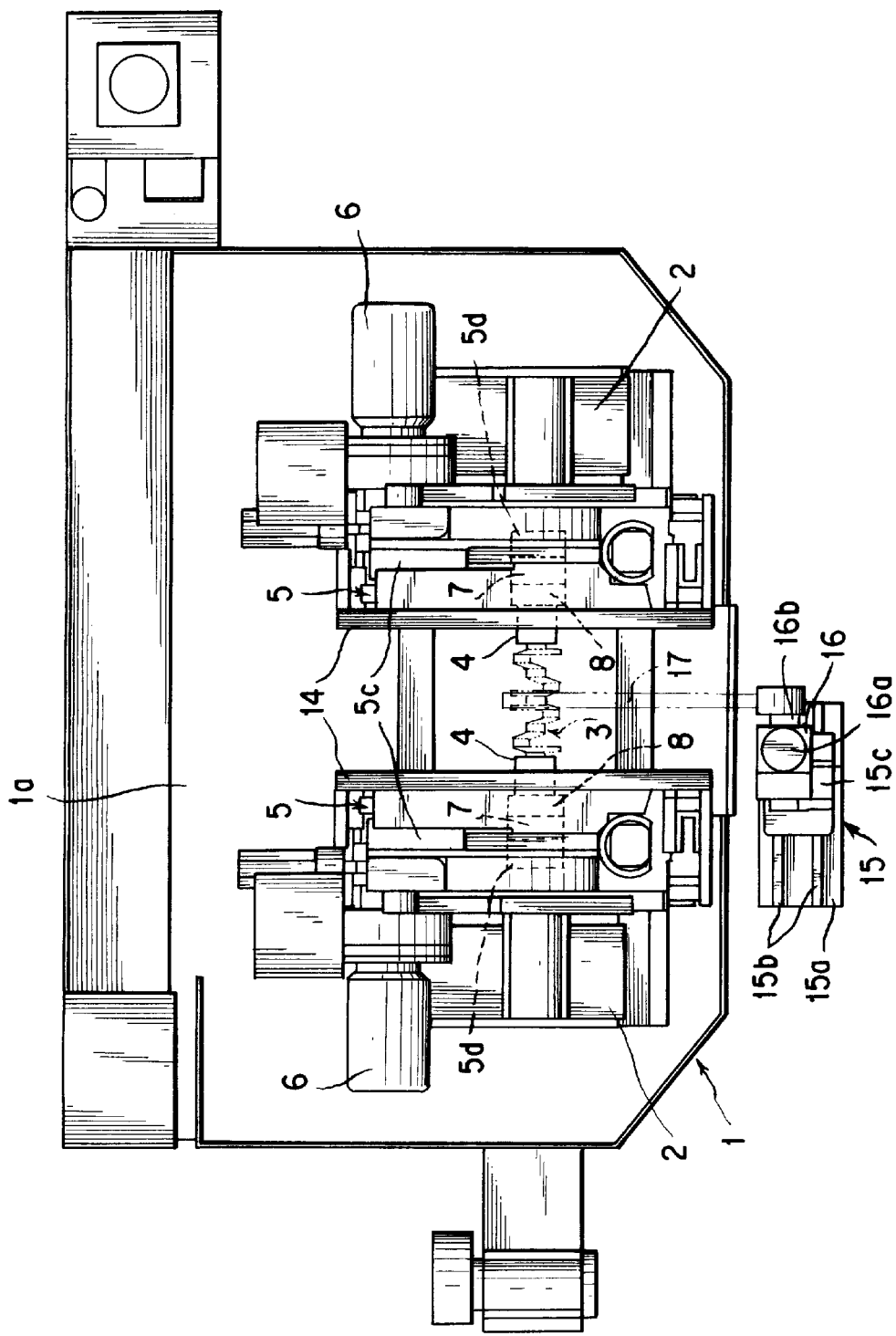
FIG. 1 is a diagrammatic top plan view illustrating a crankshaft fabricating miller of internal type that incorporates a cutter changing system according to a first form of embodiment of the present invention.
Figure 2:
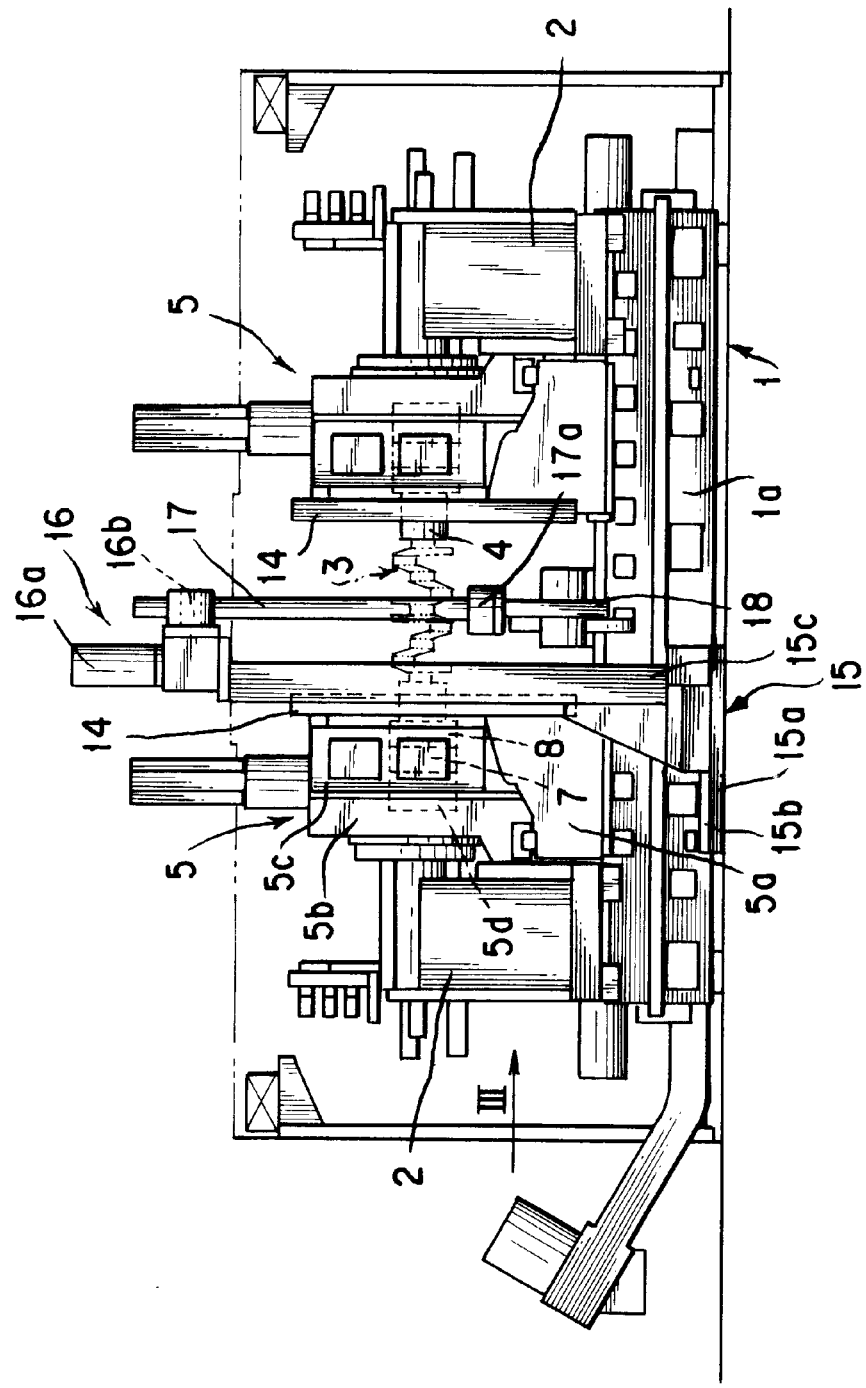
FIG. 2 is a diagrammatic front view illustrating the crankshaft fabricating miller of internal type that incorporates the cutter changing system according to the first form of embodiment of the present invention.
Figure 3:
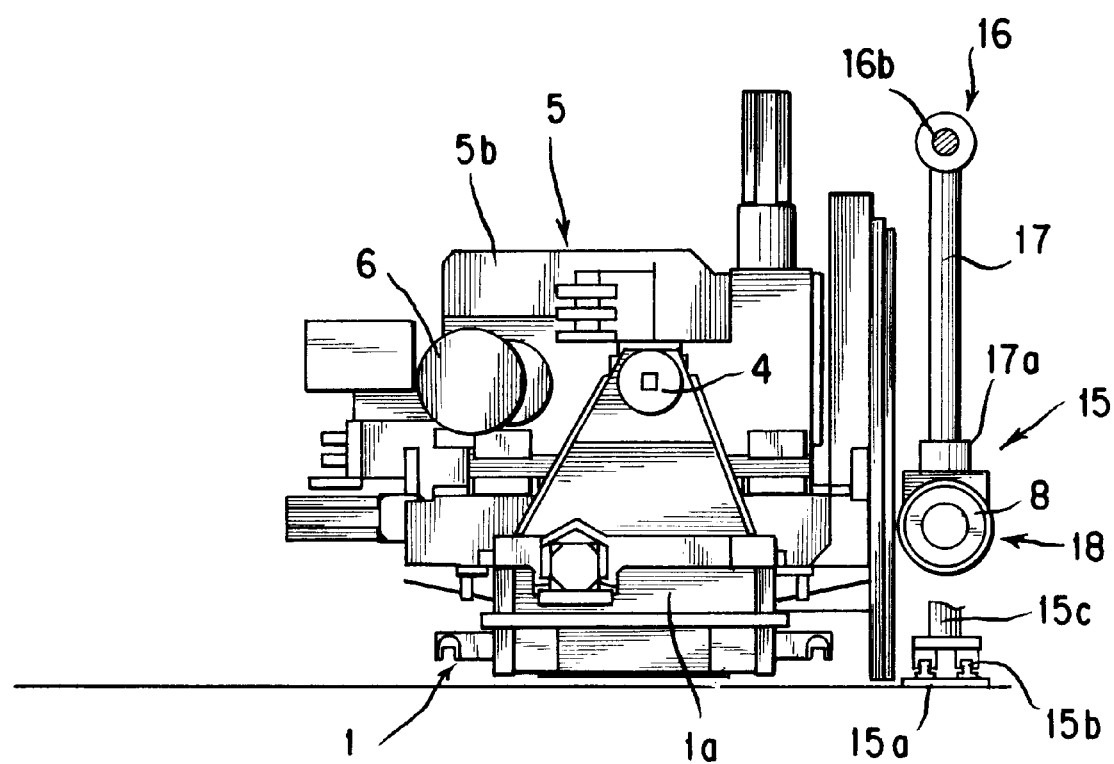
FIG. 3 is a side view of the miller as seen in the direction indicated by the arrow III in FIG. 2.

A cutter changing system for a crankshaft fabricating miller of internal type depicted in FIGS. 1 to 9 is adapted to perform a cutter change on an automatic basis. Referring first to FIGS. 1 and 2 and also in part to FIG. 3, the crankshaft fabricating miller of internal type indicated by reference character 1 (that may hereinafter be simply referred to as "the miller") includes a bed 1a on which a pair of work heads 2 are mounted as juxtaposed with or opposed to each other, and supported so as to be movable towards and away from each other. The surfaces of the work heads 2 that are opposing to each other carry chucks 4, respectively, which are adapted to clamp and fix a workpiece 3 in position between them.

Also disposed between the work heads 2 lie a pair of cutter units 5 so as to be movable longitudinally of the workpiece 3 held clamped by the chucks 4.

As shown in FIG. 2, each of the cutter units 5 includes a saddle 5a that is movable longitudinally of the workpiece 3, a slider 5b that is mounted on the saddle 51a so as to be movable in a direction orthogonal to the direction in which the saddle 5a is movable, and a swing arm 5c that is mounted to the slider 5b as capable of being swung in a vertical plane. A cutter drum 5d is in turn mounted to the swing arm 5c for rotational driving by a cutter motor 6 in each of the cutter units 5.

The surfaces of the cutter drums 5d in the cutter units 5 which are opposing to each other have each a cutter body 8 detachably mounted thereto via a cutter adapter 7 as shown in FIGS. 1 and 2.

Figure 7:
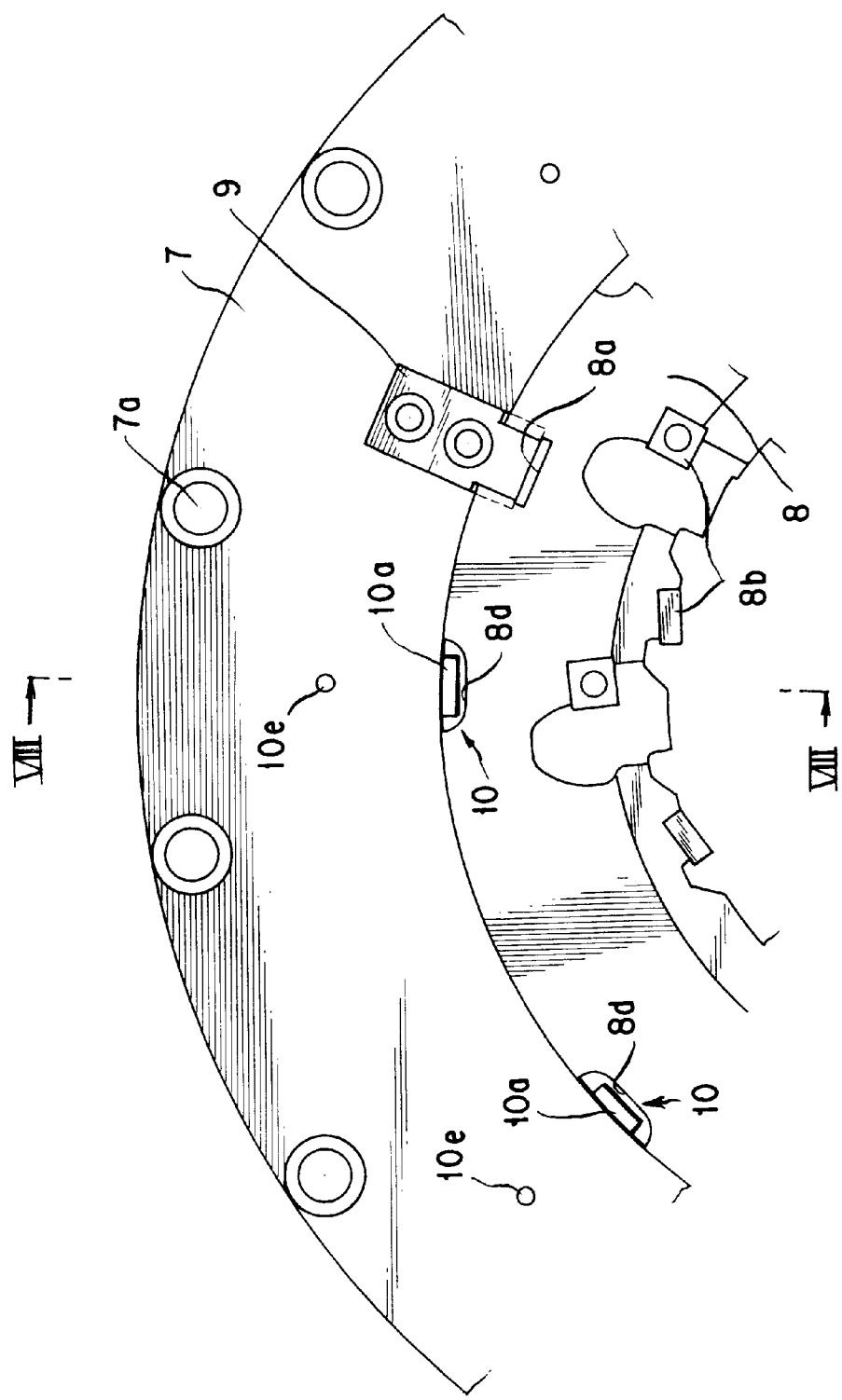
FIG. 7 is a diagrammatic front view illustrating a cutter adapter and a cutter body for use in a cutter changing system included in a crankshaft fabricating miller of internal type in accordance with a second form of embodiment of the present invention.

As shown in FIG. 7 each of the cutter adapters 7 is shaped in the form of a ring. In order to be detachably mounted to, and fitted with, the cutter drum 5d, the cutter adapter 7 has a plurality of fitting holes 7a formed by drilling circumferentially along an outer peripheral side.

In addition, the cutter adapter 7 has in an inner peripheral portion thereof a key or keys 9 fastened thereto that is shown to be inserted into and fitted with a key slot or slots 8a formed in an outer peripheral surface of the cutter body 8. Such a keying arrangement 9, 8a is provided to effect properly positioning the cutter body 8 and to ensure adequate transmission of a turning force therefor. It should be noted that the key slot 8a and the key 9 are each tapered in a direction of the common axial line of the cutter body 8 and the cutter adapter 7.

Detachably attached to the cutter body 8 along an inner peripheral surface thereof circumferentially spaced apart are a plurality of tips or cutting edges 8b for milling the workpiece 3.

Shown also disposed between an inner peripheral side of the cutter adapter 7 and an outer peripheral side of the cutter body 8 are one or more clamping means 10 for clamping the cutter body 8 detachably to the cutter adapter 7.

Figure 8:
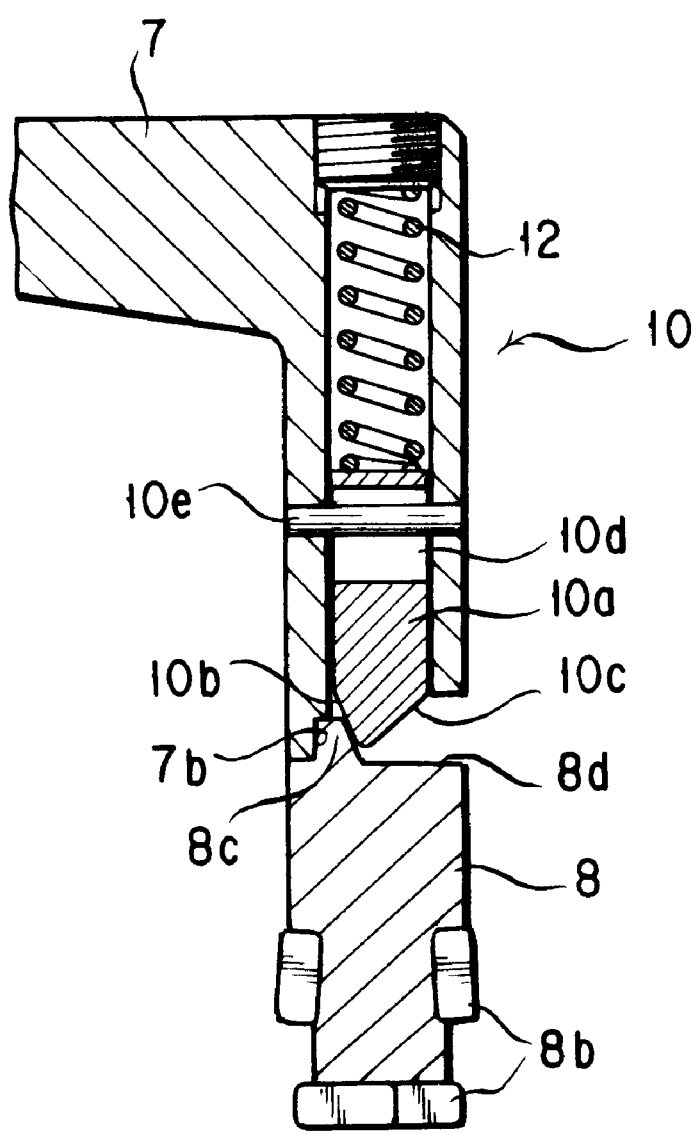
FIG. 8 is a cross sectional view of the cutter adapter and the cutter body taken along the line VIII—VIII and as viewed in the direction of the arrow in FIG. 7.

As illustrated in FIG. 8, the clamping means 10 has a pawl member 10a which is actually accommodated in the cutter adapter 7 so as to be movable in a radial direction thereof, and has a pawl member 10a biased towards a center of the cutter adapter 7 by a biasing means 12 such as a spring.

The pawl member 10a has an end portion in the form of a wedge in cross section and adapted to protrude and withdraw from the inner peripheral surface of the cutter adapter 7. And, that end portion is formed with an inclined surface of engagement 10b that is adapted in combination with an annular cutter seat or cutter accepting seat 7 to clamp a hold and stop portion 8c of the cutter body 8 between them.

The hold and stop portion 8c of the cutter body 8 is provided by forming a portion of recess 8d for each of the clamping means 10 in the outer peripheral side of the cutter body 8 (see FIG. 7), and has an inclination such that it may be intimately contacted by the incline surface of engagement 10b of the pawl member 10a.

Figure 9:
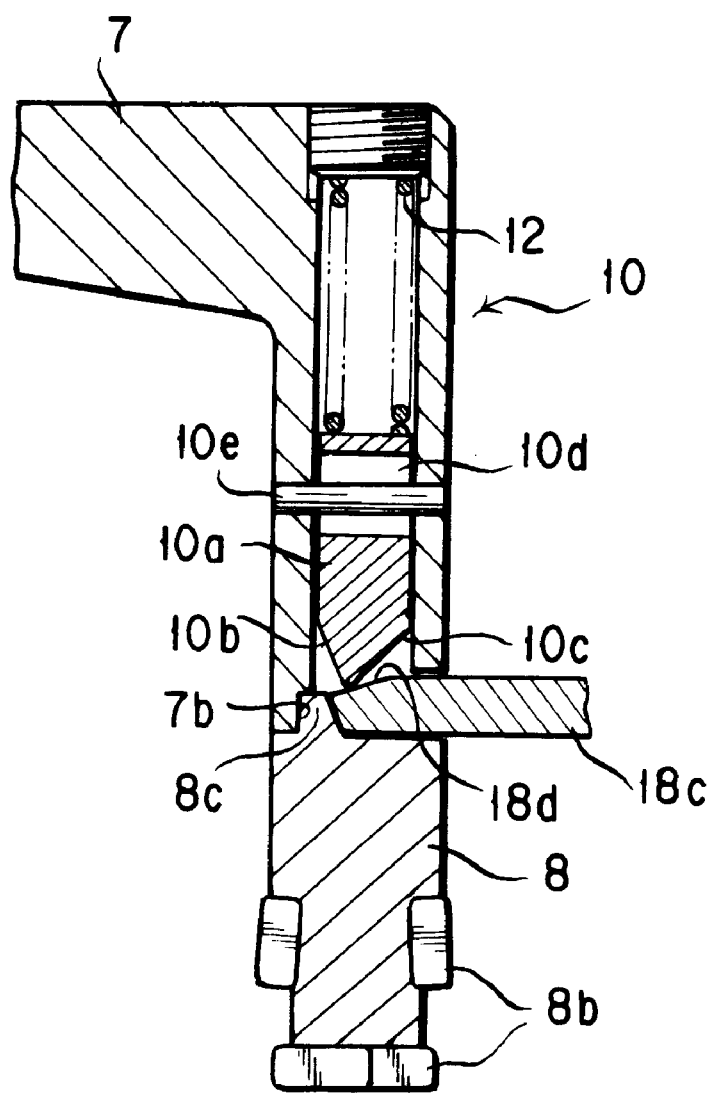
FIG. 9 is an operation illustrative view of the cutter changing system shown in FIG. 7.
Figure 10:
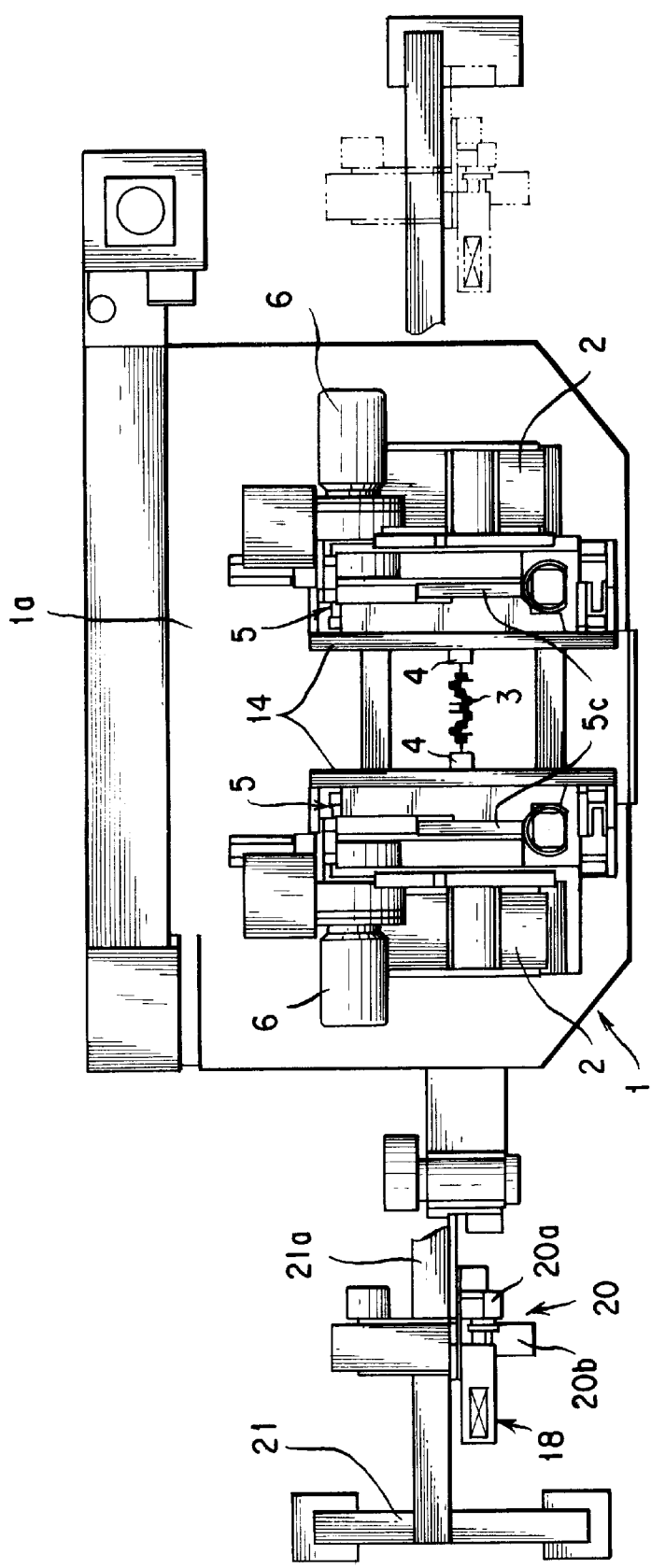
FIG. 10 is a diagrammatic top plan view illustrating a crankshaft fabricating miller of internal type that incorporates a cutter changing system according to a second form of embodiment of the present invention.
Figure 11:
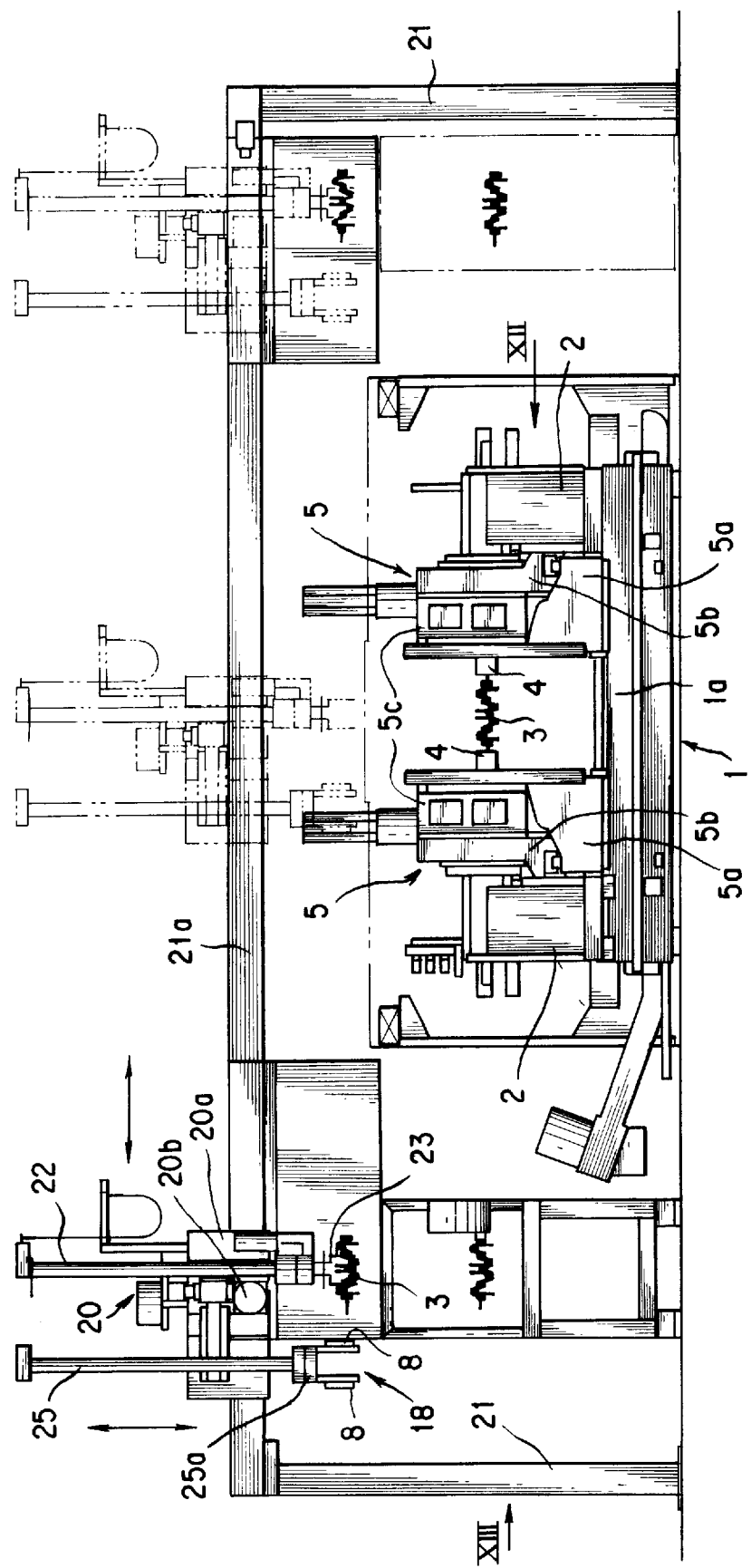
FIG. 11 is a diagrammatic front view illustrating the crankshaft fabricating miller of internal type that incorporates the cutter changing system according to the second form of embodiment of the present invention.
Figure 13:
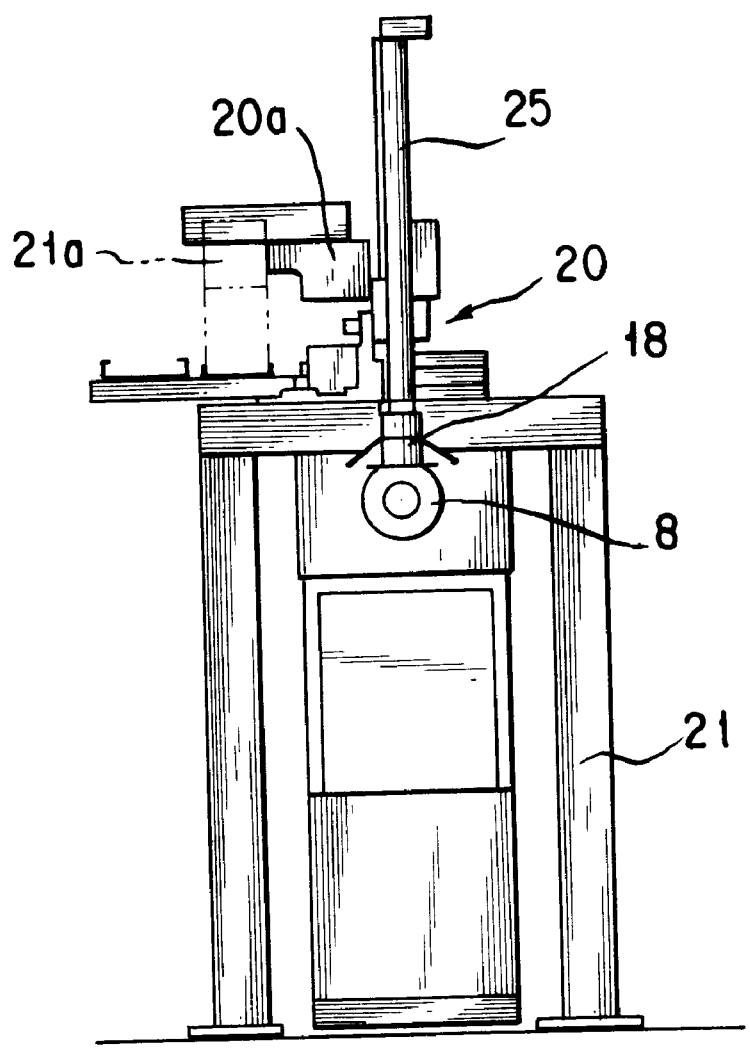
FIG. 13 is a side view of the miller as seen in the direction indicated by the arrow XIII in FIG. 11.

The wedge shaped end of the pawl member 10a has its other inclined surface 10c formed to provide for a guide surface which as shown in FIG. 9 is adapted to be contacted by a means 18d for retracting the pawl member 10a when the cutter body 8 is dismounted or removed.

An elongate bore 10d which is formed by drilling into a base side of the pawl member 10a has a pin 10e slidably received therein that penetrates and passes through the cutter adapter 7 to prevent the pawl member 10a from coming out of the cutter adapter 7.

On the other hand, as shown in FIGS. 1 and 2 the surfaces of the cutter units 5 that are opposing to each other have rest means 14 mounted thereto as fixed to the saddles 5a for supporting the workpiece 3. A cutter changing system 15 has a body portion disposed in front of the body portion of the miller 1.

The cutter changing system 15 includes a base 15a placed on a floor area ahead of the miller machine 1 and a pair of guide rails 15b laid on the base 15a to extend parallel to a longitudinal direction of the workpiece 3. Supported on the guide rails is the lower end of a support post 15c that is movable by a drive means not shown.

At the upper end of the support post 15c there lies a rocking means 16 for rocking or swinging an arm 17 in a plane that is orthogonal to the longitudinal direction of the workpiece 3.

The rocking means 16 has a rotary shaft 16b that can be rotated normally or reversely by a rocking motor 16a and to which the upper end of the arm 17 is attached.

The lower end side of the arm 17 that hangs down is adapted to move into and out of a space between the mutually opposing chucks 4, and is provided via a wrist portion 17a with a cutter holder means 18 left-and-right reversibly as shown in FIG. 2. And, the cutter holder means 18 is designed to detachably hold the cutter body 8.

It should be noted that the arm 17 has a preset length such that when the arm 17 is swung by driving the rocking motor 16a to move into the space between the chucks 4, the center of the cutter body 8 held by the cutter holder means 18 and the center of the cutter adapter 7 mounted to the cutter drum 5d are coincident with each other.

Figure 4:
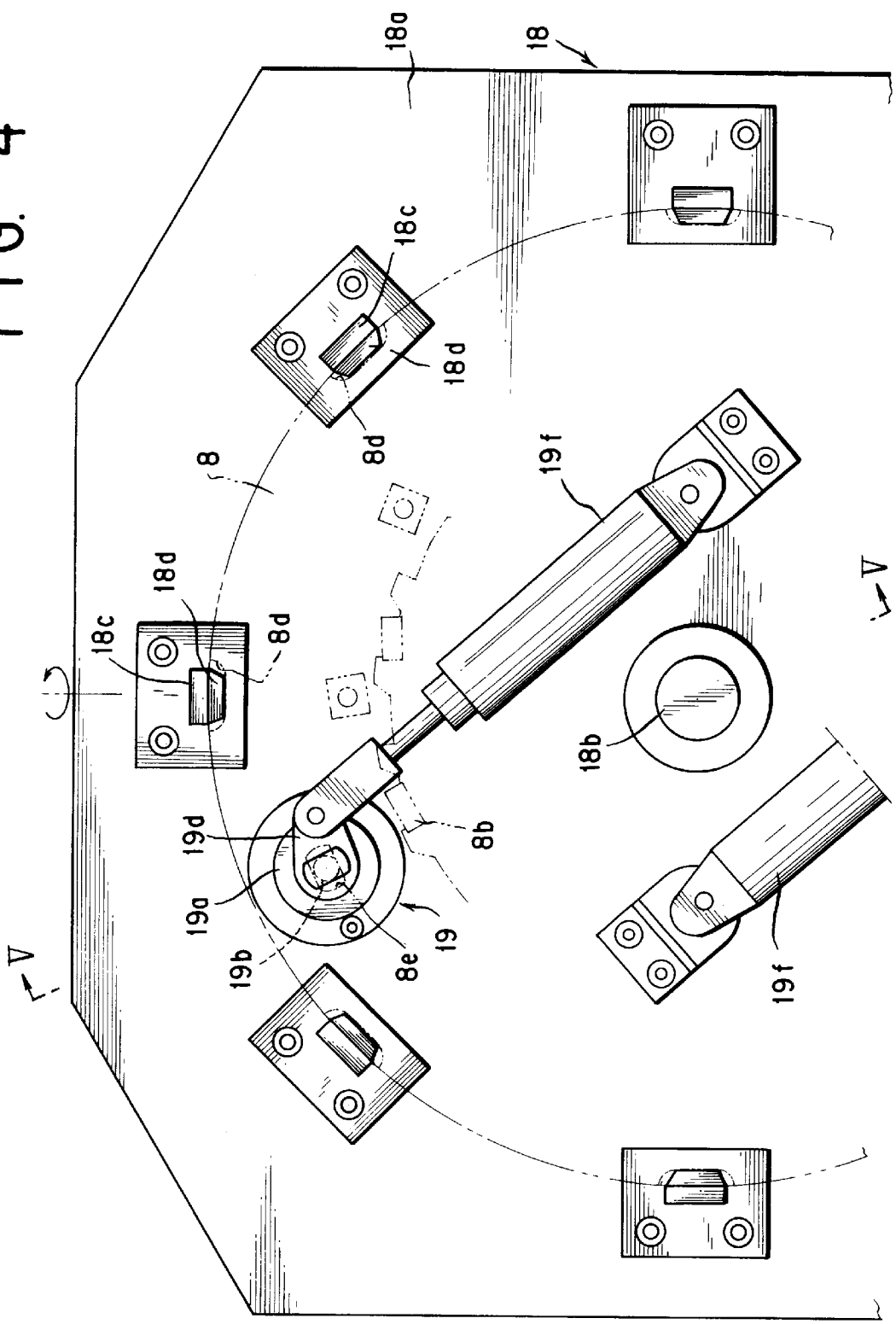
FIG. 4 is a diagrammatic front view illustrating a cutter holder means included in the cutter changing system for the crankshaft fabricating miller of internal type in accordance with the first form of embodiment of the present invention.
Figure 5:
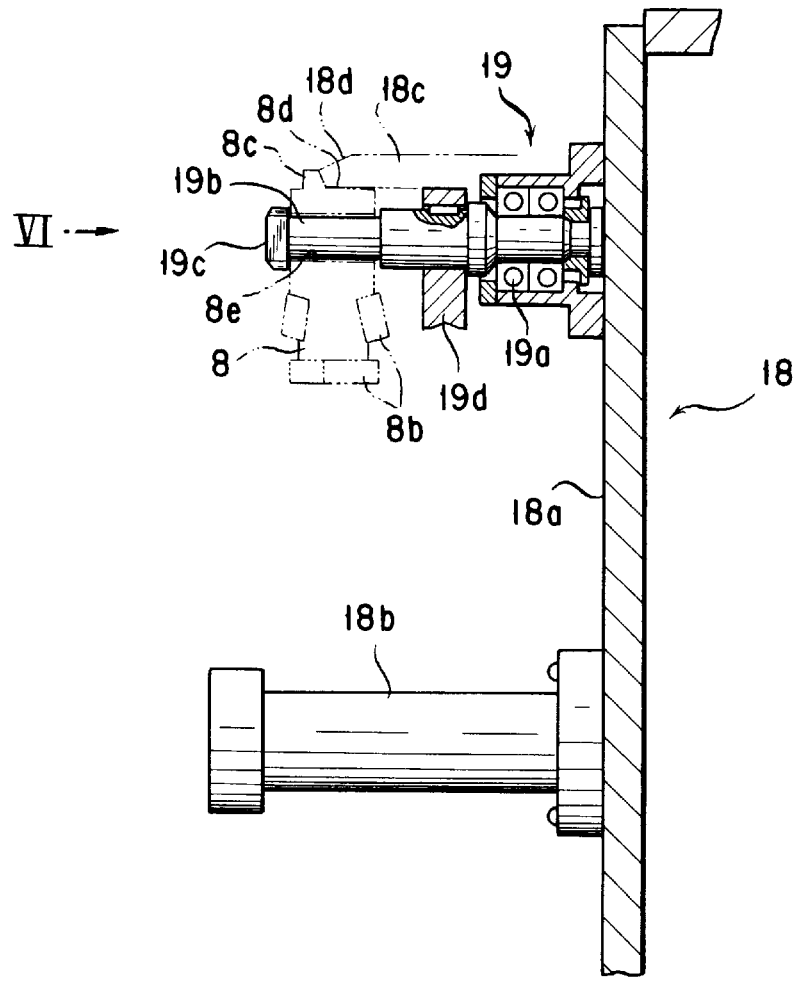
FIG. 5 is a view essentially in cross section of the cutter holder means taken along the line V—V as viewed in the direction of the arrow in FIG. 4.
Figure 6:
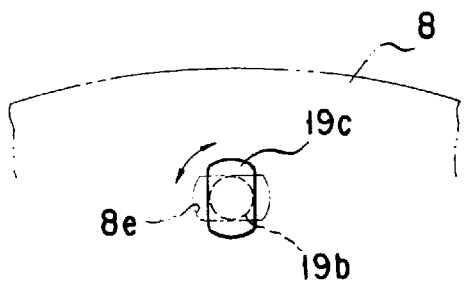
FIG. 6 is a view of a part of the cutter holder means as viewed in the direction of the arrow in FIG. 5.

As shown in FIGS. 4 and 5, the cutter holder means 18 includes a base plate 18a that is attached to the arm 17 at its wrist portion 17a. The base plate 18a is provided centrally on one of its side surfaces with a clamping shaft 18b to be clamped by a chuck 4.

Also, around the clamping shaft 18b there are provided a plurality of support blocks 18c, each for each portion of recess 8d, which when inserted into and fitted with the latter acts to support and properly position the cutter body 8. Each of these support blocks 18c is formed at its end with a pawl member retracting means 18d as shown also in FIG. 9 which when the cutter body 8 is to be dismounted is allowed to come into a pressure contact with the inclined guide surface 10c (formed as previously mentioned at the forward end of the pawl member 10a of the clamping means 10) to cause the pawl member 10a to be retracted.

Further provided on the base plate 18a are one or more (e. g., at two sites) cutter hold and stop means 19.

The cutter hold and stop means 19 may be provided to hold and stop the cutter body 18 supported by the support blocks 18c to prevent it from coming off. To this end, each cutter hold and stop unit 19 has at its one end a rotary shaft 19b that is rotatably supported via a shaft bearing 19a on the base plate 18a.

The rotary shaft 19b is adapted to be inserted into and removed from an elongate hold and stop hole 8e that is formed in the cutter body 8. To wit, as can be seen from FIGS. 5 and 6, the rotary shaft 19b has at its forward end a hold and stop portion 19c formed to project therefrom and to have the same cross sectional shape as that of the hold and stop hole 8e. Thus, running the rotary shaft 19b to pass through the hold and stop hole 8e while permitting the hold and stop portion 19c to slide into and through the hold and stop hole 8e and then rotating the rotary shaft 19b about 90 degrees will cause the hold and stop portion 19c to engage with an inner rim portion of the hold and stop hole 8c and to be anchored there, thus to hold and stop the rotary shaft 19b in position, thereby preventing it from coming out.

And, one side of a lever 19d that is keyed at its other side with the rotary shaft 196 is connected to an actuator 19f such as a hydraulic cylinder. The actuator 19f is provided to rotate the rotary shaft 19b about 90 degrees normally and reversely via the lever 19d, thus to effect holding and releasing the cutter body 8, respectively or vise versa.

The cutter changing apparatus 15 so constructed as mentioned above may be operated as described below.

In mounting the cutter bodies 8 onto the cutter adapters 7 attached to the cutter drums 5d in the miller machine 1, first the cutter drums 5d in the cutter units 5 are rotated for indexing and ceases rotating at a cutter changing position. Then, on placing the support blocks 18c in the cutter holder means 18 at the lower end of the arm 17 to be in coincidence with the portions of recess 8d in each of the cutter bodies 8, the rotary shaft 19b in the cutter hold and stop means 19 is inserted into the hold and stop hole 8e in the cutter body 8 and with the cutter body 8 along its outer periphery supported by the support blocks 18c, is rotated about 90 degrees by the actuator 19f to hold and stop or anchor the cutter body 8 in position.

Then, in that state the rotary shaft 16b is rotated by the rocking motor 16a to rock or swing the arm 17 and to move its lower end into the space between the chucks 4. The center of the cutter body 8 held by the cutter holder means 18 at the lower end of the arm 17 is now placed in coincidence with the center of the cutter adapter 7.

It should be noted that the operation mentioned in the preceding paragraph can be performed by the rocking motor 16a so as to rotate the rotary shaft 16b for indexing.

After positioning the center of the cutter body 8 to coincide with the center of the cutter adapter 7 as mentioned above, first the cutter body 8 is mounted on the cutter adapter 7 in one of the cutter unit 5.

In so mounting the cutter body 8, first the clamping shaft 18b formed to project from the base plate 18b in the cutter holder means 18 is clamped by the chuck 4.

Since this permits both the upper and lower ends of the arm 17 to be supported, the arm if less of rigidity is prevented from rocking unstably.

Then, in that state the cutter unit 5 to have the cutter body 8 mounted thereon is moved to the cutter holder means 18 side to push the cutter body 8 held by the cutter holder means 18 into the cutter adapter 7 and thus to mount the cutter body 8 onto the cutter adapter 7. The principle that underlies this operation is described below.

Pushing the cutter adapter 7 against the cutter body 8 by the cutter unit 5 causes first the inclined guide surface 10c of the pawl member 10a to be pushed against the outer peripheral surface of the cutter body, thus causing the forward end portion of the pawl member 10a to be retracted or to withdraw.

Then, further pushing the cutter adapter 7 in causes the hold and stop or anchoring portion 8c in an outer peripheral portion of the cutter body 8 to come into pressure contact with the cutter seat 7b in the cutter adapter 7 and at the same time the forward end of the pawl member 10a to reach an upper surface of the pawl retracting means 18d and thus the entrance of the portion of the recess 8d in an outer peripheral portion of the cutter body 8.

Then in that state, after rotating the rotary shaft 19b about 90 degrees reversely by the actuator 19f, thereby releasing the holding or anchorage of the cutter body 8, retracting the cutter unit 5 with the chuck 4 released causes the pawl member 10a that has remain retracted by the pawl retracting means 18d in the support block 18c to move into the portion of recess 8d, and the inclined guide surface 10b of the pawl member 10a to engage with the hold and stop or anchoring portion 8c, thereby permitting the cutter body 8 to be mounted onto the cutter adapter 7.

After a cutter body 8 is mounted onto the one cutter unit 5 in the manner described above, a cutter body 8 can be likewise mounted onto the other cutter unit 5. The cutter bodies 8 can be mounted onto the left and right hand side cutter units 5 with a single cutter holder means 18 by left-and-right reversing the latter.

On the other hand, if cutter bodies 8 used are to be changed therewith separate cutter bodies 8 for replacement with, the used cutter bodies 8 are dismounted from the cutter adapters 7 by performing the operation described in a reversed order. The cutter bodies 8 are replaced for the used cutter bodies 8 and then are mounted onto the cutter adapters 7 in the manner described. Thus, a cutter body 8 changing operation can be performed on an automatic basis.

As can readily be seen, it is possible to provide cutter holder means 18 at both sides of the lower end of the arm 17. This advantageously permits a cutter change to be effected in the manner that while a cutter body 8 being changed with is held by one of the cutter holder means 18, a cutter body 8 being changed for is dismounted from the other cutter holder means 18, and then on left-and-right reversing the lower end of the arm 17, the cutter body 8 being changed with the separate cutter body 8 is mounted onto the cutter adapter 7, and so forth. A further substantial reduction of time for a cutter change is thus achieved.

While the first form of embodiment of the present invention has so far be described in which a cutter body 8 change is effected using a cutter change system whose body portion is arranged in the vicinity of the miller machine 1, it should be noted that such a cutter change system can make use of a general purpose robot to perform a cutter change.

Alternatively, cutter bodies 18 may be changed automatically by utilizing an automatic loader 20 that loads and unloads workpieces 3 into and from the miller machine 1 as in a second form of embodiment of the present invention as will be described with reference to FIGS. 10 through 13.

Referring now to FIGS. 10 to 13 in which the same reference characters as in FIGS. 1 to 9 are used to indicate the same components or parts in the first form of embodiment of the invention, an elucidation will be given of such a second form of embodiment of the present invention.

Above a miller machine 1 there is provided a cross beam 21a supported at its opposite ends by frames 21 so as to extend parallel to a longitudinal direction of a workpiece 3.

The cross bar 21a has a traveling member 20a in an automatic loader 20 supported thereon as movable by a motor 20b.

The traveling member 20a is provided with a work grasping means 23 that is movable up and down by means of a lift cylinder 22. The work grasping means 23 is provided to take hold of a workpiece to be milled and a workpiece that has been milled and to move such a workpiece 3 from a region above the miller machine 1 into a region between the chucks 4. The traveling member 20a also carries a cutter holder means 18 mounted thereon.

The traveling member 20a is further provided with a lift arm 25 that is movable up and down by a lifting means not shown. The lower end of the lift arm 25 has a cutter holder means 18 mounted thereto that is similar to that in the first form of embodiment as previously described.

The cutter changing system so constructed as mentioned above may be operated as described below.

In mounting a cutter body 8 onto the cutter adapter 7 attached to the cutter drum 5d in the miller machine 1, the support blocks 18c in the cutter holder means 18 mounted to the lower end of the lift arm 25 are positioned to coincide with the portions of recess 8d in the cutter body 8, respectively. Thereafter, the rotary shaft 19b in the cutter hold and stop or anchoring means 19 is inserted into the hold and stop or anchoring hole 8e in the cutter body 8. Then, on having the support blocks 18c support the outer periphery of the cutter body 8, the rotary shaft 19b is rotated by the actuator 19f about 90 degrees to hold and stop or anchor the cutter body 8 in position.

Then in that state, after the lift arm 25 is raised lifting the cutter holder means 18 to a workpiece transfer height, the traveling member 20a in the automatic loader 20 is moved into a region between the chucks 4 in the work heads 2. In this state, the lift arm 25 is lowered to place the center of the cutter body 8 held by the cutter holder means 18 in coincidence with the center of the cutter adapter 7.

Thereafter, in that state, the traveling member 20a in the automatic loader 20 is moved to the cutter unit 5 side to push the cutter body 8 held by the cutter holder means 18 into the cutter adapter 7, thereby mounting the cutter body onto the cutter adapter 7. The principle that underlies this operation is described below.

Pushing the cutter adapter 7 against the cutter body 8 with the traveling member 20a in the automatic loader 20 causes first the inclined guide surface 10c of the pawl member 10a to be pushed against the outer peripheral surface of the cutter body, thus causing the forward end portion of the pawl member 10a to be retracted or to withdraw.

Then, further pushing the cutter adapter 7 in causes the hold and stop or anchoring portion 8c in an outer peripheral portion of the cutter body 8 to come into pressure contact with the cutter seat 7b in the cutter adapter 7 and at the same time the forward end of the pawl member 10a to reach an upper surface of the pawl retracting means 18d and thus the entrance of the portion of the recess 10a in an outer peripheral portion of the cutter body 8.

Then, in that state, after rotating the rotary shaft 19b about 90 degrees reversely by the actuator 19f, thereby releasing the holding or anchorage of the cutter body 8, retracting the traveling member 20a in the automatic loader 20 with releasing the chuck 4 causes the pawl member 10a that has remain retracted by the pawl retracting means 18d in the support block 18c to move into the portion of recess 8d, and the inclined guide surface 10b of the pawl member 10a to engage with the hold and stop or anchoring portion 8c, thereby permitting the cutter body 8 to be mounted onto the cutter adapter 7.

After a cutter body 8 is mounted onto the one cutter unit 5 in the manner described above, a cutter body 8 can be likewise mounted onto the other cutter unit 5. The cutter bodies 8 can be mounted onto the left and right hand side cutter units 5 with a single cutter holder means 18 by left-and-right reversing the single cutter holder means 18 by the use of a wrist portion 25a provided at the lower end of the lift arm 25.

On the other hand, if cutter bodies 8 used are to be changed with separate cutter bodies 8, the used cutter bodies are dismounted from the cutter adapters 7 by performing the operation described above in a reversed order. Cutter bodies 8 are replaced for the used cutter bodies 8 and then are mounted onto the cutter adapters 7 in the manner described. Thus, a cutter body 8 changing operation can be performed on an automatic basis by utilizing an automatic loader for workpieces as described above.

While in the second form of embodiment described above the traveling member 20a after the cutter body 8 is moved into between the chucks 4 by the automatic loader 20 is moved to the cutter unit 5 side to mount and dismount the cutter body 8, the cutter body 8 can likewise be mounted and dismounted alternatively by moving the cutter unit 5.

Also, as in the first form of embodiment, the cutter holder means 18 may be provided at both sides of the lower end of the arm 17 to permit a mounting and a dismounting operation for the cutter bodies 8 to be carried out in a single step of operation.

While the first and second forms of embodiment of the present invention are both designed to change the cutter bodies automatically with an automatically operable the cutter changing system, it should be noted that it is still possible to change cutter bodies manually by using a cutter changing jig as in a third form of embodiment of the present invention as will be described.

Now with reference to FIGS. 14 to 17, an elucidation will be given of such a third form of embodiment of the present invention.

Figure 14:
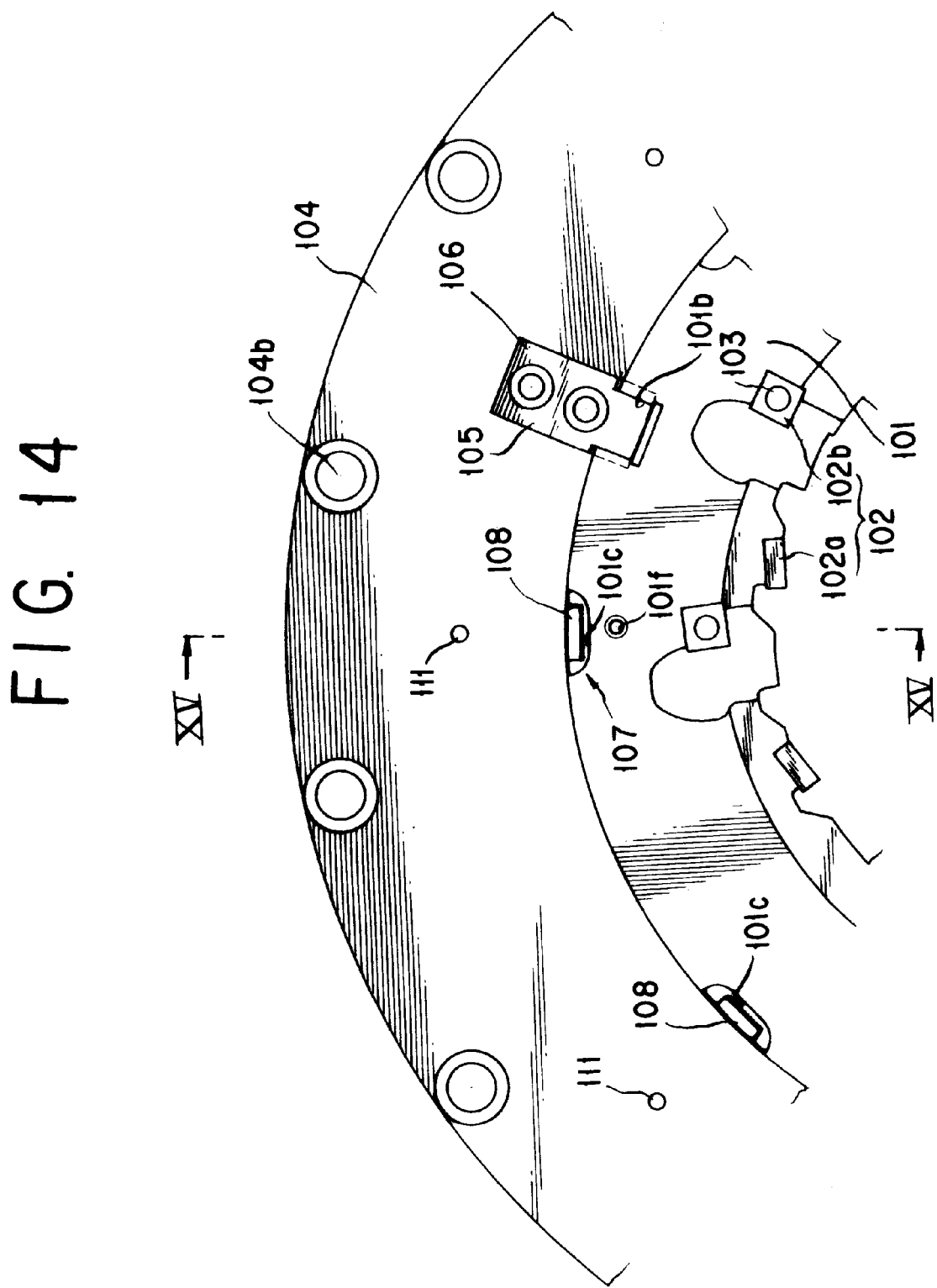
FIG. 14 is a diagrammatic front view illustrating a cutter adapter and a cutter body for use in a cutter changing system included in a crankshaft fabricating miller of internal type in accordance with a third form of embodiment of the present invention.
Figure 15:
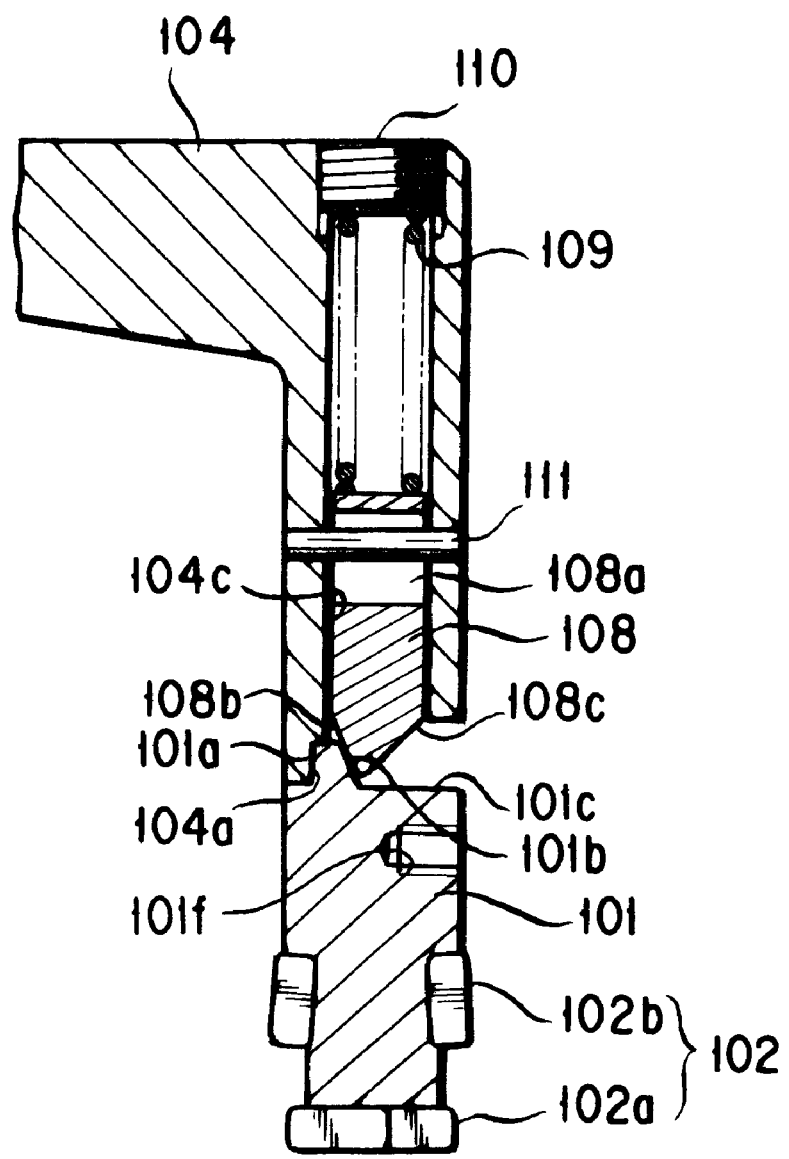
FIG. 15 is a cross sectional view of the cutter adapter and the cutter body taken along the line XV—XV and as viewed in the direction of the arrow in FIG. 14.
Figure 16:
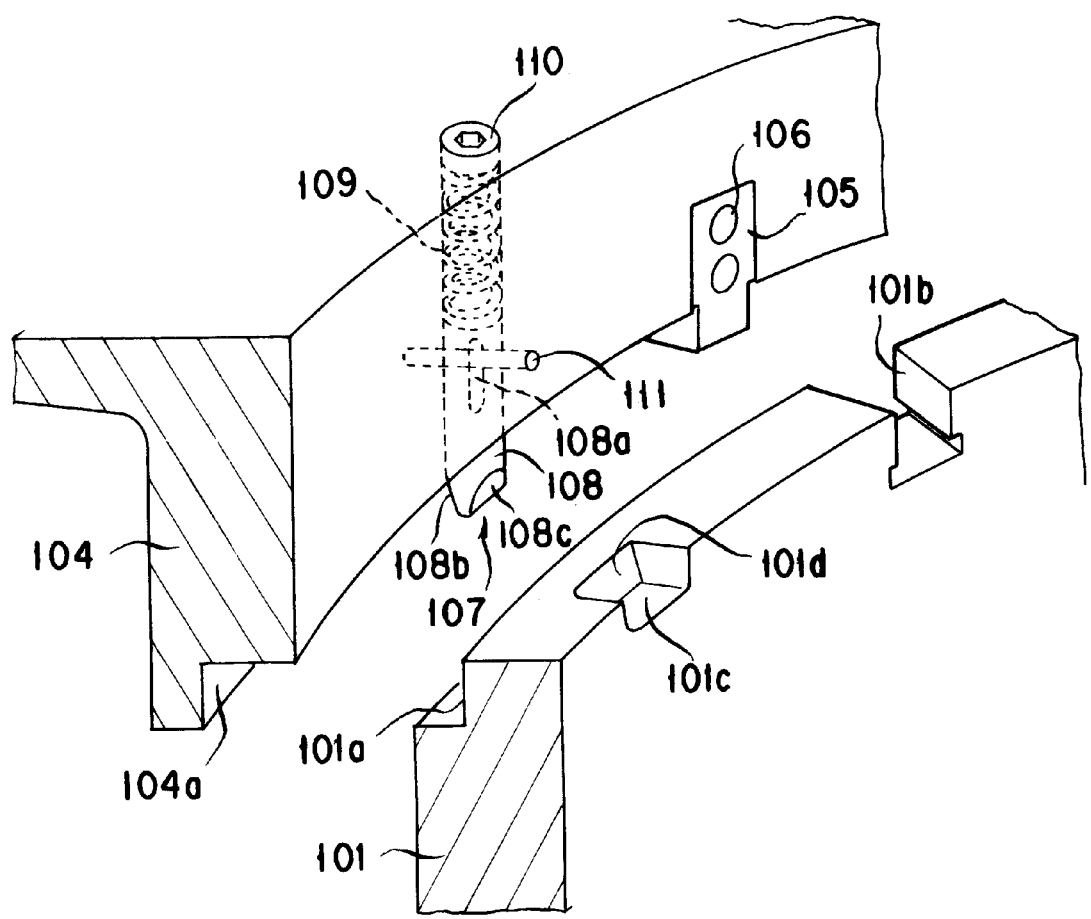
FIG. 16 is a perspective view, partly cut away, diagrammatically illustrating a cutter adapter and a cutter body for use in a cutter changing system included in a crankshaft fabricating miller of internal type in accordance with the third form of embodiment of the present invention.
Figure 17:
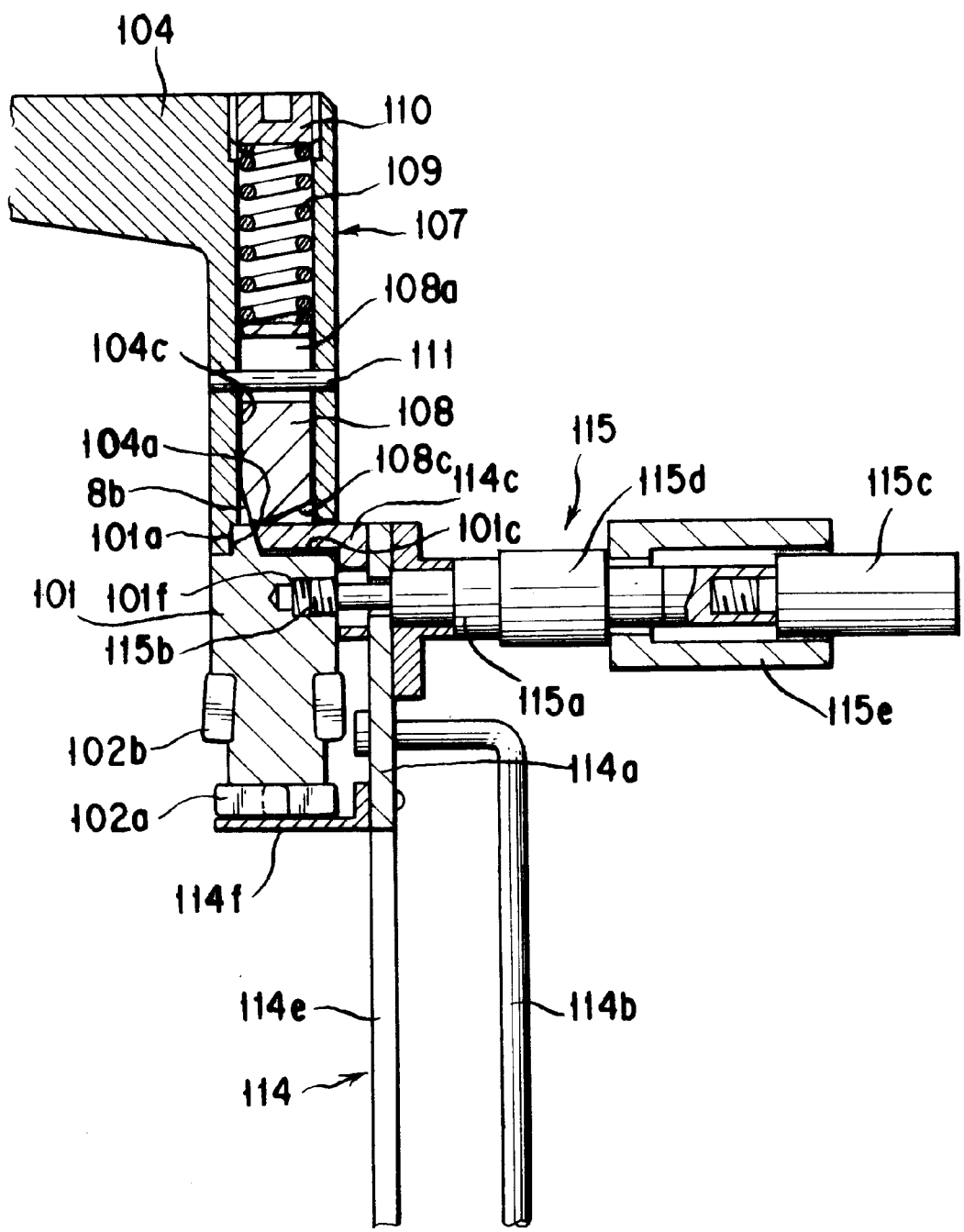
FIG. 17 is an operation illustrative view of the cutter changing system for the crankshaft fabricating miller of internal type according to the third form of embodiment of the present invention.

FIG. 14 is a front view illustrating a cutter adapter and a cutter body for use in a cutter changing system that represents the third form of embodiment of the present invention; FIG. 15 is a cross sectional view of the cutter adapter and the cutter body taken along the line XV—XV as viewed in FIG. 14; FIG. 16 is a perspective view, partly cut away, illustrating a clamping means; and FIG. 17 is an operation illustrative view of the cutter changing system while a cutter body is being dismounted and mounted.

In these Figures, a cutter body, indicated at 101, is in the form of a ring having a number of tips or cutting edges 102 attached thereto along an inner peripheral surface thereof circumferentially spaced apart from each other.

The tips 102 include tips 102a designed for milling to shape pin and journal peripheral surfaces, and tips 102b designed for milling to shape shoulder flanks of a crankshaft. These tips 102a and 102b are detachably attached to the cutter body 101 by means of fastening members 103.

The cutter body 101a has an outer peripheral side in which as shown in FIG. 16 an annular indented portion 101c is circumferentially formed, with which an annular cutter accepting seat 104a formed to project on an inner peripheral surface of a cutter adapter 104 is designed to engage when the cutter body 101 is inserted into and fitted with the cutter adapter 104.

Also as shown in FIG. 16, the cutter body 101 formed in an outer peripheral surface thereof with one or more key slot 101b that is tapered in a direction of the axial line of the cutter body 101 and into which are to be inserted correspondingly one or more keys 105 formed on the cutter adapter 104 side and tapered in a direction of the axial line of the cutter adapter 104 as shown also in FIG. 14.

The cutter adapter 104 is also in the form of a ring and has along its outer peripheral side a plurality of fitting holes 104b formed circumferentially spaced apart from each other for the cutter adapter 104 to be attached to a cutter drum in a crankshaft fabricating miller (not shown). The cutter adapter 104 has also along its inner peripheral side one ends of the above mentioned keys 105 fastened thereto by means of fastening members 106.

The other ends of the keys 105 project from the inner peripheral surface of the cutter adapter 104. Thus, positioning these other ends of the keys 105 to be in coincidence with the key slots 101b in the cutter body 101 to bring the outer peripheral surface of the cutter body 101 into intimate contact with the inner peripheral surface of the cutter adapter 104 effects properly positioning (or centering) the cutter body 101 with respect to the cutter adapter 104, and at the same time adequate transmission of a turning force from the cutter adapter 104 side via the keys 105 onto the cutter body 101.

On the other hand, one or more clamping means 107 are interposed at one or more sites between the cutter body 101 and the cutter adapter 104 for removably clamping the cutter body 101 onto the cutter adapter 104.

As shown in FIGS. 15 and 16, the clamping means 107 includes a pawl member 108 that is adapted to be inserted into and fitted with a portion of recess 101c formed in an outer peripheral surface of the cutter body 101 to engage with an inclined engageable anchoring surface 110d formed at a rising portion of the portion of recess 101c.

The pawl member 108 is accommodated in a guide hole 104c formed radially in the cutter adapter 104 and lies in that hole 104c on an inner peripheral end side of the cutter adapter 104 so as to be movable radially of the cutter adapter 104. And a biasing means 109 comprising a compression spring is accommodated in the guide hole 104c and lies in this hole on an outer peripheral end side of the cutter adapter 104 to bias the pawl member 108 towards the cutter body 101.

An adjustment screw 110 is threadedly fitted into the guide hole 104c on an outer peripheral side end portion of the cutter adapter 104 to adjust a biasing force imparted by the biasing means 109 to the pawl member 108. The pawl member 108 has an elongate hole 108a formed by drilling on a base end side thereof, into and through which is inserted a pin 111 having its opposite ends fastened to the cutter adapter 104, the pin 111 preventing the pawl member 108 from coming out of the guide hole 104c.

The pawl member 108 when advanced and retracted in the guide hole 104c makes its projecting forward end appear and disappear on the inner peripheral surface of the cutter adapter 104. That forward end of the pawl member 108 is formed on its one side with an inclined engaging surface 108b adapted to engage with an engageable surface 101d formed in the portion of recess 101c of the cutter body 101, and on its opposite side (side opposite to the inclined engaging surface 108b) with an inclined guide surface 108c to be pressure contacted by a pawl retracting member 114c provided in a cutter changing jig 114.

The cutter changing jig 114 as shown in FIG. 17 comprises a jig body 114a in the form of a disk having a diameter slightly larger than the outer diameter of the cutter body 101, and has a handle 114*b* and at least a pair of support means 115 attached to the jig body 114*a*.

The support means 115 includes a support shaft 115*a* rotatably journaled on the jig body 114*a* and has at one end side of the support shaft 115*a* a threaded collar 115*b* to be fitted into a threaded hole 101*f* formed in the cutter body 101. The support means 115 also is provided at the other end side of the support shaft 115*a* with a hand grip 115*c*.

Between the hand grip 115*c* and a large diameter portion 115*d* that constitutes a mid portion of the support shaft 115*a*, a weight 115*e* is slidably carried on the support shaft 115*a* as movable in its axial directions. The pawl retracting member 114*c* mentioned above, in the form nearly of a character "L", is located near the threaded column 115*b*.

The pawl retracting member 114*c* has its one end side fastened to the jig body 114*a* and its other end side extending parallel to the support shaft 15*a*, and is operable in such a manner that pressing with its forward end the inclined guide surface 108*c* of the pawl member 108 causes the pawl member 108 to be retracted.

The cutter changing jig 114 also has, around a circular hole 114*e* opened in the jig body 114*a*, a support cylinder 114*f* fastened thereto for supporting the inner peripheral surface of the cutter body 101.

The cutter changing system according to the third form of embodiment of the invention so constructed as mentioned above may be operated as described below.

In mounting a cutter body 101 onto the cutter adapter 104 that has been preliminarily mounted onto the cutter drum in the crankshaft fabricating miller as previously described, first the support cylinder 114*f* of the cutter changing jig 114 is fitted into the inner peripheral portion of the cutter body 101 from the side of one side surface of the cutter body 101. Then, in this state, the hand grip 115*c* of the support means 115 is rotated to fit the threaded portion 115*b* of the support shaft 115*a* into the threaded hole 10*f* in the cutter body 101.

Thereafter, in that state, the handle 114*b* of the cutter changing jig 114 is grasped to hold the cutter body 101 vertically or so, and the key 105 on the cutter adapter 104 side is fitted into the key slot 101*b* in the cutter body 101. Then, on fitting the outer peripheral surface of the cutter body 101 with the inner peripheral surface of the cutter adapter 104, the cutter body 101 is pressed into the cutter adapter 104 (as shown in FIG. 17, from the right hand side).

Pressing the cutter body 101 so into the cutter adapter 104 causes the flank of the indented portion 101*a* in the cutter body 101 to press the inclined guide surface 8*c* at the forward end of the pawl member 108 that projects on the inner periphery of the cutter adapter 104, thus causing the pawl member 108 to be retracted to bring its forward end into the guide hole 104*c*. With the pawl member 108 so retracted, the outer peripheral surface of the cutter body 101 is permitted to pass by the forward end of the pawl member 108 and thus to allow the cutter accepting seat 104*a* of the cutter adapter 104 to engage with the indented portion 101*a* of the cutter body 101 as shown in FIG. 17 while holding the pawl member 108 to remain retracted or retreated with the forward end of the pawl retracting member 114*c*.

Next, in that state, the hand grip 115*c* is reversely rotated to cause the support shaft 115*a* and thus also the pawl retracting member 114*c* to recede. The pawl retracting member 114*c* receding permits the pawl member 108 to be advanced by the biasing force applied by the biasing means 109, thus to move its forward end into the portion of recess 101*c* on the outer periphery of the cutter body 101, causing the inclined engaging surface 108*b* on the pawl member 108 to engage with the engageable surface 101*d* in the portion of recess 101*c*. As a consequence, the outer periphery of the cutter body is clamped between the cutter accepting seat 104*a* of the cutter adapter 104 and the inclined engaging surface 108*b* of the pawl member 108.

It is therefore seen that a cutter body 101 can be mounted onto the cutter adapter 104 to permit a workpiece to be milled thereafter to fabricate a crankshaft therefrom simply by pushing the cutter body 101 into the cutter adapter 104 using the cutter changing jig 114 and then removing the cutter changing jig from the cutter body 101.

Also, in milling a workpiece with tips 104 attached to the inner peripheral surface of the cutter body, it should be noted that a turning force applied from the cutter adapter 104 and transmitted to the cutter body 101 is transmitted through the key 105 and thus can in no way act directly on the pawl member 108 in the clamping means 107, and so can be a cutter reaction force generated in the cutter body 101.

On the other hand, in order to dismount the cutter body 101 from the cutter adapter 104 to change for the cutter body 101, first the cutter changing jig 114 is applied to the side surface of the cutter body 101. The cutter retracting member 114*c* of the cutter changing jig 114 may then be operated to retract the pawl member 108 to locate its forward end at the position indicated in FIG. 17. The handle 114*b* of the cutter changing jig 114 may then be held to pull the cutter body 101 out of the cutter adapter 104. If fitting the cutter body 101 tightly with the cutter adapter 104 makes it hard to detach the cutter body 101 from the cutter adapter 104, the cutter body 101 can be simply pulled out by jogging the hand grip 115*c* to cause the weight 115 to impact the hand grip 115*c* and thus to impart impacts via the support shaft 115*a* to the cutter body 101.

While the cutter changing system according to the third form of embodiment of the invention so far described makes use of a keying arrangement with the key 105 of the cutter adapter 104 fitting into the key slot 101*a* of the cutter body 101 to provide positioning the cutter body 101 relative to the cutter adapter 104 and to ensure transmission of a turning force, a cutter changing system may alternatively use a coupling arrangement in which the cutter adapter 104 and the cutter body 101 are coupled together via tapered spline means to likewise achieve these ends as in a forth form of embodiment of the invention to be described below with reference to FIGS. 18 to 21.

An explanation will now be given of a cutter changing system that represents the forth form of embodiment of the present invention. It should be noted that in FIGS. 18 to 21 the same reference characters as in FIGS. 14 to 17 are used to designate the same parts or components and their detailed explanation are here omitted.

Figure 18:
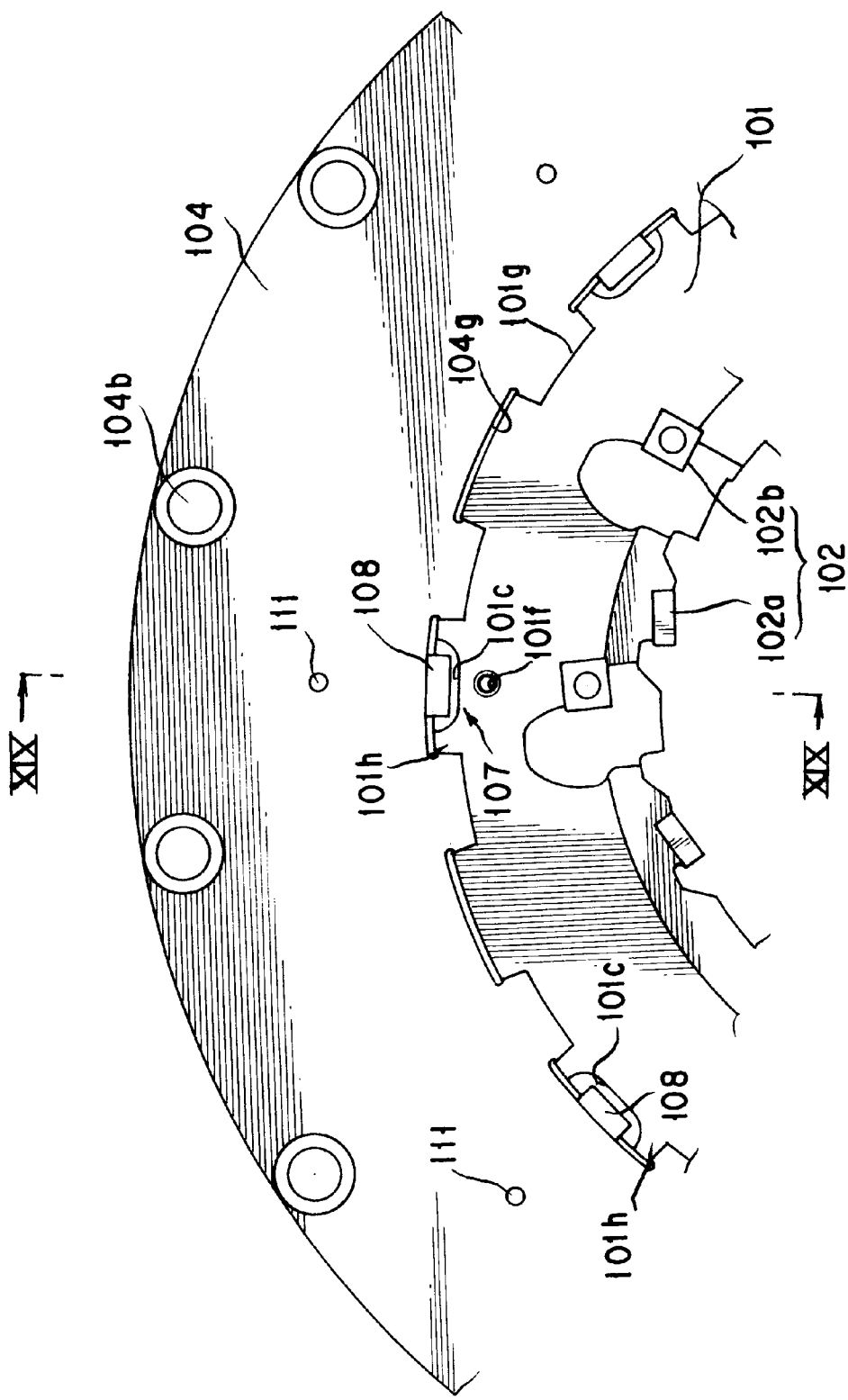
FIG. 18 is a front view, that is partly cut away, diagrammatically illustrating a cutter adapter and a cutter body for use in a cutter changing system included in a crankshaft fabricating miller of internal type in accordance with a fourth form of embodiment of the present invention.
Figure 21:
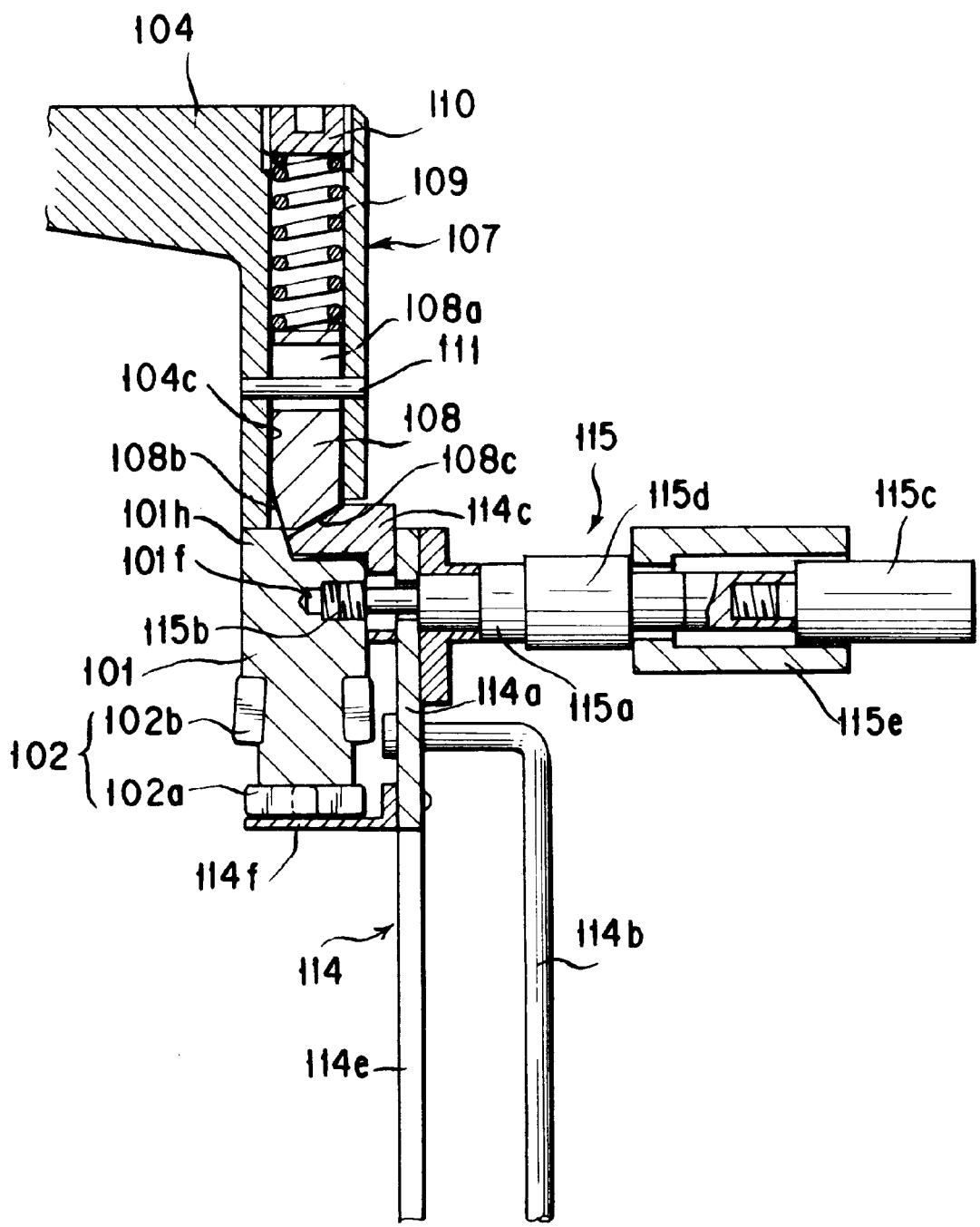
FIG. 21 is an operation illustrative view of the cutter changing system for the crankshaft fabricating miller of internal type according to the fourth form of embodiment of the present invention.

In the cutter changing system according to the forth form of embodiment of the invention, as shown in FIGS. 18 and 21 the inner peripheral surface of the cutter adapter 104 and the outer peripheral surface of the cutter body 101 are formed over their respective entire areas with first tapered splines 104*g* and second tapered splines 101*g*, respectively, each of which is tapered in a direction of the axis of the cutter adapter 104. These first and second tapered splines 104*g* and 101*g* when mutually engaged with are designed to provide a proper positioning (including both centering and axial positioning) of the cutter body 101 relative to the cutter adapter 104 and to ensure an adequate transmission of a turning force from the cutter adapter 104 onto the cutter body 101. Note also that a clamping means 107 is provided between the cutter body 101 and the cutter adapter 104.

Figure 19:
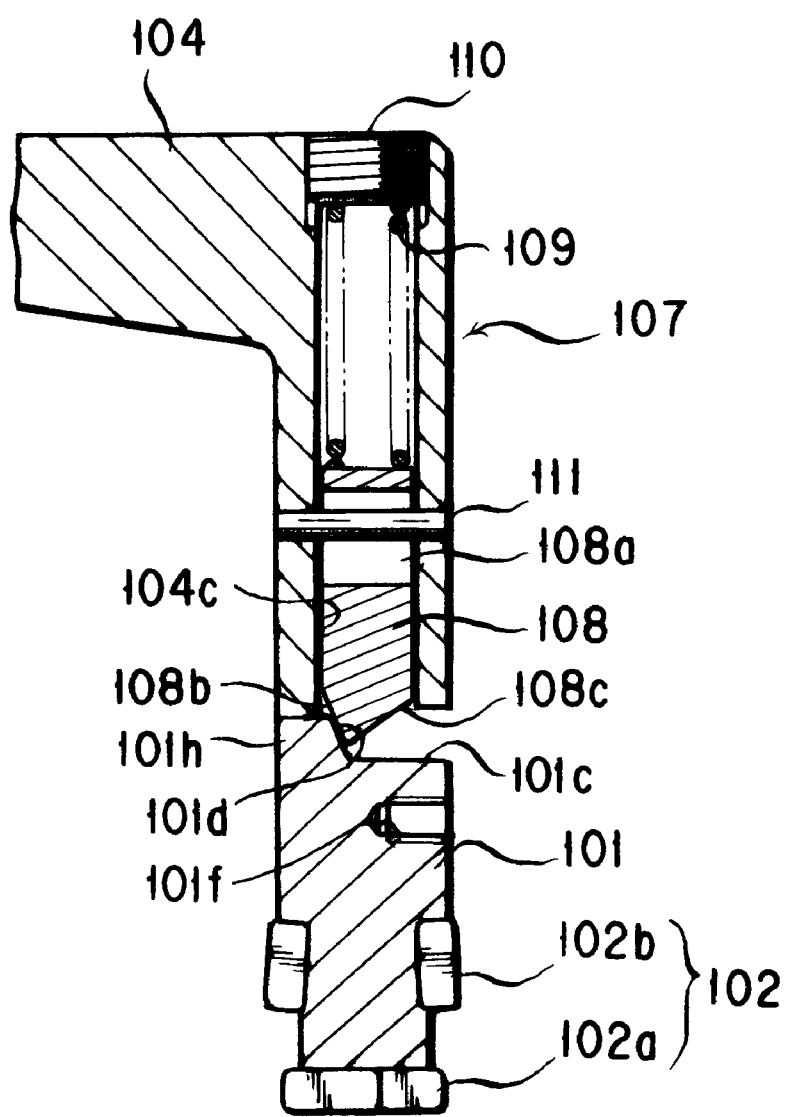
FIG. 19 is a cross sectional view of the cutter adapter and the cutter body taken along the line XIX—XIX as viewed in the direction of the arrow in FIG. 18.
Figure 20:
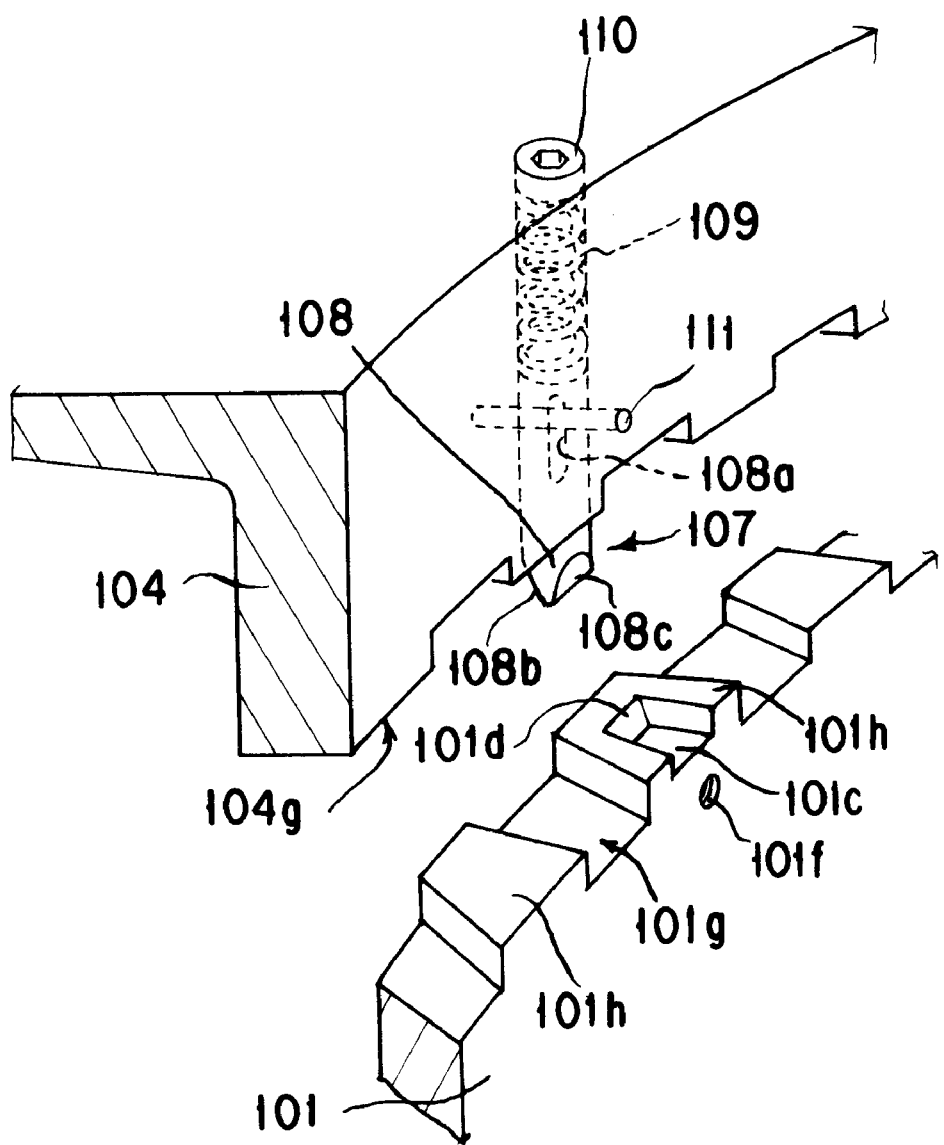
FIG. 20 is a perspective view, partly cut away, diagrammatically illustrating the cutter adapter and the cutter body for use in the cutter changing system included in the crankshaft fabricating miller of internal type in accordance with the fourth form of embodiment of the present invention.

The clamp means 107 as shown in FIGS. 18 to 20 comprises portions of recess 101c formed in raised portions 101h, e.g., on alternate portions, of the tapered splines 101g on the outer peripheral surface of the cutter body 101, and pawl members 108 to be inserted into and fitted with the portions of recess 101c, respectively.

Each of the portions of recess 101 has its depth reaching approximately one half the thickness of the cutter body 101 from one of its side surfaces and is formed at its rising portion with a hold and stop or anchoring surface 101d to be engaged by an inclined engaging surface 108b formed on each of the pawl members 108.

It should also be noted that each of the pawl members 108 as is that in the third form of embodiment of the invention described previously, is accommodated in a guide hole 104b formed in the cutter adapter 104 side so as to be movable in a radial direction of the cutter adapter 104. Here again, the pawl member 108 is biased towards the cutter body 101 side by a biasing means 109 and is formed on its forward end with the inclined engaging surface 108b and an inclined guide surface 108c.

The cutter changing system according to the fourth form of embodiment of the invention that is constructed as mentioned above may be operated as described below.

First, as in the third form of embodiment the cutter changing jig 114 is mounted onto one side surface of the cutter body 101 previously mounted onto the cutter adapter, and thereafter the handle 114b for the cutter changing jig 114 is held to hold the cutter body in a vertical alignment. Next, in this state, with the tapered splines 101g formed on the outer peripheral surface of the cutter body 101 being mated with the tapered splines 104g formed on the inner peripheral surface of the cutter adapter 104, the cutter body 101 is pressed into the cutter adapter 104 as shown in FIG. 21, from the right hand side.

Pressing the cutter body 101 so into the cutter adapter 104 causes the raised portion 101h of the tapered splines 101g formed on the outer peripheral surface of the cutter body 101 to press the inclined guiding surface 108c on the pawl member 108, thus causing the pawl member 108 to be retracted to bring its forward portion into the guide hole 104c. So retracting the pawl member 108 permits the raised portion 101h to pass by the forward end of the pawl body 108 as shown in FIG. 21, thus to allow the first set of the tapered splines 101g on the cutter body 101 and the second set of tapered splines 104g on the cutter adapter 104 to engage intimately with each other.

Thereafter, removing the cutter changing jig 114 as in the third form of embodiment permits the forward end of the pawl member 108 as shown in FIG. 19 to be advanced by the biasing force applied by the biasing means 109, thus to move its forward end into the portion of recess 101c on the outer periphery of the cutter body 101, causing the inclined engaging surface 108b on the pawl member 108 to engage with the engageable surface 101d in the portion of recess 101c. This, in combination with what the tapered splines 101g and 104g mutually engaged do, clamps the cutter body 101 not to come out from the cutter adapter 104.

It is therefore seen that a cutter body 101 can be mounted onto the cutter adapter 104 to permit a workpiece to be milled thereafter to fabricate a crankshaft therefrom simply by pushing the cutter body 101 into the cutter adapter 104 using the cutter changing jig 114 and thereafter removing the cutter changing jig from the cutter body 101.

It will be apparent that the cutter body 101 can be dismounted from the cutter adapter 104 by performing the preceding operation in a reversed order.

Figure 22:
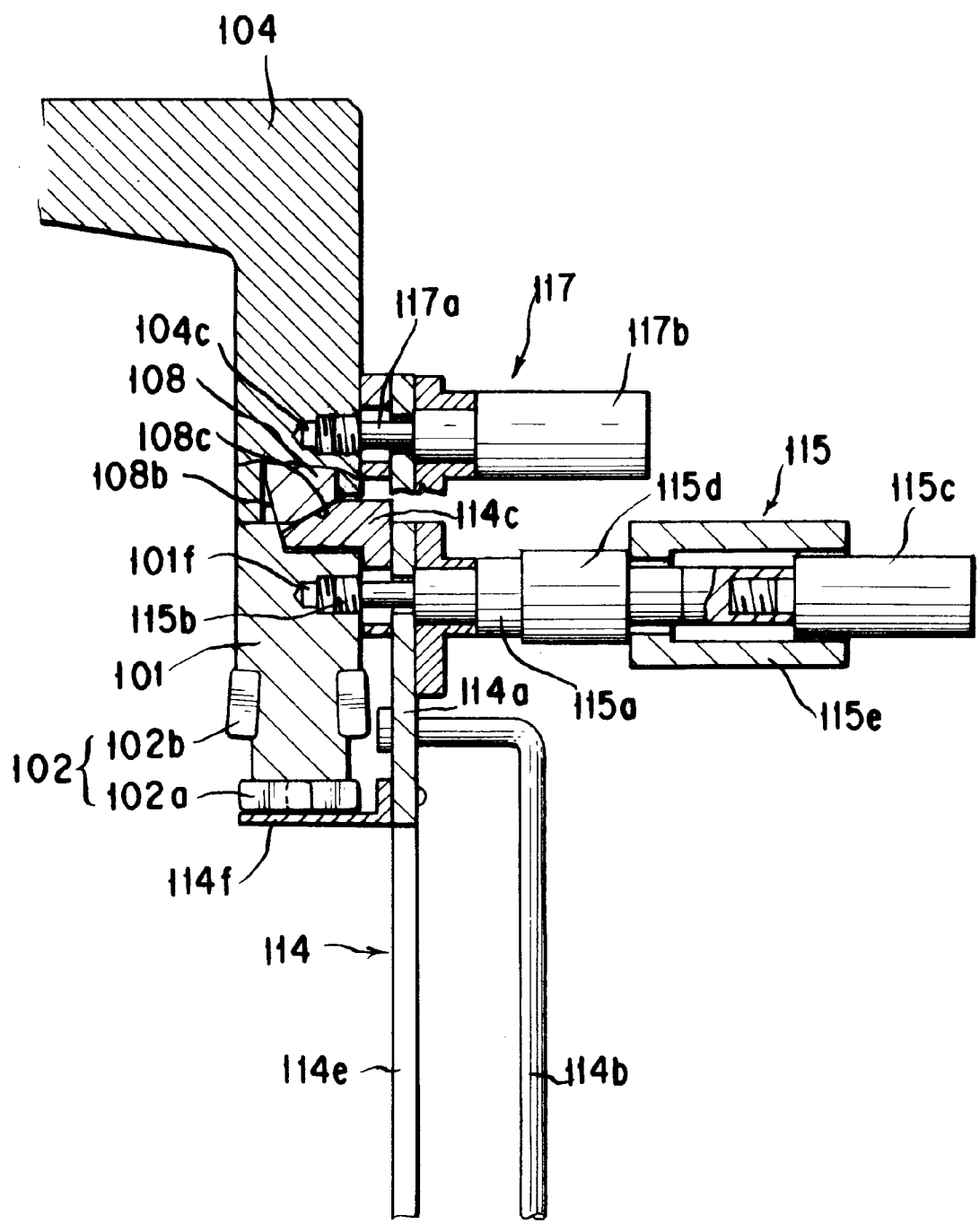
FIG. 22 is an illustrative view showing a modified form of embodiment of a cutter changing jig for use in mounting and dismounting the cutter body.

FIG. 22 shows a modified form of embodiment of the cutter changing jig 114 which will be described below.

It should be noted that the clamping force by the pawl member 108 can be intensified by intensifying the biasing force exerted by the biasing means 109, However, intensifying the biasing force by the biasing means 109 may make the use of the cutter changing jig 114 to push the cutter body 101 into the cutter adapter 104 insufficient to retract the pawl member 108 with the pawl retracting member 114c alone or may then necessitate an increased thrusting force to retract the pawl member 108. Thus, in order to obtain an increased thrusting force, in a modification as shown in FIG. 22 the cutter changing jig 114 is provided in a region of the support means 115 with a force augmenting means 117 that comprises a threaded shaft 117a that is mating with a threaded hole 104 formed in the cutter adapter 104c, and a hand grip 117b rotatable to rotationally move the threaded shaft 117a forth and back.

After the cutter body 101 is mounted onto the cutter adapter 104 using the cutter changing jig 114, the hand grip 117b is rotated to screw the threaded shaft 17a into the threaded hole 104c in the cutter adapter 104.

With the cutter changing jig 114 thus attracted onto the cutter adapter 104 side, the forward end of the pawl retracting member 114c in the cutter changing jig 114 is permitted to firmly press the inclined guide surface 108c of the pawl member 108, thus permitting the pawl member 108 to be retracted with a reduced pressure if the biasing force by the biasing means 109 is intensified.

While the cutter changing systems according to the first and second forms of embodiment of the invention before described make use of a keying arrangement with the key 9 of the cutter adapter 7 side fitting into the tapered key slot 8a formed in the outer periphery of the cutter body 8 to provide positioning the cutter body 8 relative to the cutter adapter 7 and to ensure transmission of a turning force, these cutter changing systems may be modified by alternatively using a coupling arrangement wherein the cutter adapter 7 is formed on its inner peripheral surface with a first set of tapered splines and the cutter body 8 is formed on its outer peripheral surface with a second set of tapered splines which are to be coupled to and decoupled from those splines to likewise achieve these ends as in the fourth form of embodiment of the present invention described above.

Also, while the first through fourth forms of embodiment are all designed to push the cutter body and the pawl retracting means together into the cutter adapter when the cutter body is mounted onto the cutter adapter, these forms of embodiment may be modified to the effect that the cutter body alone is pushed into the cutter adapter in the cutter mounting operation and the pawl retracting means is used only in the cutter dismounting operation.

While the present invention has hereinbefore been set forth with respect to certain illustrative embodiments thereof, it will readily be appreciated by a person skilled in the art to be obvious that many alterations thereof, omissions therefrom and additions thereto can be made without departing from the essence and the scope of the present invention. Accordingly, it should be understood that the invention is not intended to be limited to the specific embodiments thereof set out above, but to include all possible embodiments thereof that can be made within the scope with respect to the features specifically set forth in the appended claims and encompasses all the equivalents thereof.

What is claimed is:

1. A cutter changing system for an internal crankshaft fabricating miller in which a cutter body having tips attached thereto along an inner peripheral surface thereof is fitted with and fixed to a cutter adapter so as to be rotatable together with the cutter adapter about an axis, thereby permitting a workpiece to be machined therewith by milling to fabricate a crankshaft, the cutter changing system comprising:

at least one recessed portion formed in an outer peripheral portion of said cutter body;

at least one clamping means including:

a pawl member disposed in said cutter adapter so as to be movable in a radial direction thereof to set a forward end of said pawl member to protrude and withdraw from an inner peripheral surface of said cutter adapter, said pawl member having an inclined engagement surface and an inclined guide surface both formed on said forward end of the pawl member and located respectively at a fore and a rear portion thereof in a direction in which said cutter body is fitted to said cutter adapter, and a means for biasing said pawl member in said radial direction to set said forward end thereof to protrude from said inner peripheral surface of said cutter adapter; and at least one pawl retracting means operable when said cutter body is fitted into said cutter adapter, whereby upon insertion of said at least one pawl retracting means into said at least one recessed portion, said at least one pawl retracting means comes into a pressure contact with the inclined guide surface of said pawl member, retracting said pawl member against said means for biasing, and whereby fitting said cutter body and said at least one pawl retracting means into said cutter adapter causes said at least one pawl retracting means combined with the outer peripheral portion of said cutter body to retract said pawl member, and thereafter extracting said at least one pawl retracting means causes said pawl member to project into said at least one recessed portion thereby clamping said cutter body onto said cutter adapter with said inclined engagement surface, and inserting said at least one pawl retracting means into said at least one recessed portion causes said pawl member to be retracted to release said clamping and to thereby permit said cutter body to be removed together with said at least one pawl retracting means from said cutter adapter.

2. The cutter changing system for the internal crankshaft fabricating miller as set forth in claim 1, further comprising a raised annular cutter accepting seat formed on an inner peripheral surface of said cutter adapter and an annular indented portion formed on an outer peripheral surface of said cutter body and adapted to come into engagement with said raised annular cutter accepting seat.

3. The cutter changing system for the internal crankshaft fabricating miller as set forth in claim 1, further comprising a first tapered spline formed in said inner peripheral surface of said cutter adapter and a second tapered spline formed in an outer peripheral surface of said cutter body and adapted to come into engagement with said first tapered spline.

4. The cutter changing system for the internal crankshaft fabricating miller as set forth in claim 1, claim 2 or claim 3, further comprising:

a cutter unit having said cutter adapter mounted thereto so as to be rotatable for indexing;

an arm disposed adjacent to said miller capable of being swung in directions in which said cutter body is loaded and unloaded; and a cutter holder means disposed on a end of said arm for holding said cutter body detachably, said cutter holder means including a means for positioning said cutter body and further including said at least one pawl retracting means.

5. The cutter changing system for the internal crankshaft fabricating miller as set forth in claim 4, in which said cutter holder means includes a clamping shaft to be clamped by a chuck in said miller.

6. The cutter changing system for the internal crankshaft fabricating miller as set forth in claim 1, claim 2 or claim 3, in which the miller includes an automatic loader for loading and unloading a workpiece onto and out of the miller, the cutter changing system further comprising:

a cutter unit having said cutter adapter mounted thereto so as to be rotatable for indexing; and a cutter holder means mounted to said automatic loader so as to be vertically movable, said cutter holder means is for holding said cutter body detachably, said cutter holder means including a means for positioning said cutter body and further including said at least one pawl retracting means.

7. The cutter changing system for the internal crankshaft fabricating miller as set forth in claim 6, in which said cutter holder means includes a clamping shaft to be clamped by a chuck in said miller.

8. The cutter changing system for the internal crankshaft fabricating miller as set forth in claim 1, claim 2 or claim 3, further comprising:

a cutter unit having said cutter adapter mounted thereto so as to be rotatable for indexing; and a cutter changing jig for holding said cutter body detachably, said cutter changing jig including at least a pair of means for supporting said cutter body and further including said at least one pawl retracting means.

9. The cutter changing system for the internal crankshaft fabricating miller as set forth in claim 8, in which said cutter changing jig further includes a force augmenting means positioned adjacent to said means for supporting.

10. A method for changing a cutter in an internal crankshaft miller in which a cutter body having tips attached thereto along an inner peripheral surface thereof is fitted with and fixed to a cutter adapter so as to be rotatable together with the cutter adapter, thereby permitting a workpiece to be machined therewith by milling to fabricate a crankshaft, the cutter changing method comprising the steps of:

providing said cutter adapter with a means for clamping said cutter body detachably;

providing a cutter changing apparatus adjacent to said miller that includes a means for detachably holding said cutter body;

holding with said means for detachably holding said cutter body;

transferring with said cutter changing apparatus said cutter body on said means for detachably holding said cutter body to a cutter changing position;

then, pushing said transferred cutter body into said cutter adapter and mounting said cutter body onto said cutter adapter with said means for clamping to complete loading said cutter body onto said cutter adapter; and unloading said cutter body from said cutter adapter by dismounting said cutter body from said cutter adapter by effecting the preceding mounting steps of operation in a reversed manner.

11. A method for changing a cutter in an internal crankshaft miller in which a cutter body having tips attached thereto along an inner peripheral surface thereof is fitted with and fixed to a cutter adapter for rotation together with the cutter adapter, thereby permitting a workpiece to be machined therewith by milling to fabricate a crankshaft, the cutter changing method comprising the steps of:

provide said cutter adapter with a means for clamping said cutter body detachably;

providing an automatic loader that loads and unloads a workpiece onto and out of said miller with a means for detachably holding a cutter body;

holding with said means for detachably holding said cutter body;

transferring with said automatic loader said cutter body on said means for detachably holding said cutter body to a cutter changing position;

pushing said transferred cutter body into said cutter adapter and mounting said cutter body onto said cutter adapter with said means for clamping to complete loading said cutter body onto said cutter adapter; and unloading said cutter body from said cutter adapter by dismounting said cutter body from said cutter adapter by effecting the preceding mounting steps of operation in a reversed manner.

12. The method for changing a cutter in an internal crankshaft miller as set forth in claim 10 or claim 11, further comprising the steps of:

providing said means for detachably holding said cutter body with a clamping shaft that protrudes therefrom; and clamping said clamping shaft with a chuck in said miller while transferring said cutter adapter to a region where said cutter body is held on said means for detachably holding said cutter body to permit said cutter body to be mounted to and dismounted from said cutter adapter in said region.

13. A cutter changing system for an internal crankshaft fabricating miller in which a cutter body having tips attached thereto along an inner peripheral surface thereof is fitted with and fixed to a cutter adapter so as to be rotatable together with the cutter adapter about an axis, thereby permitting a workpiece to be machined therewith by milling to fabricate a crankshaft, the cutter changing system comprising:

at least one recessed portion formed in an outer peripheral portion of said cutter body; and at least one clamping means including:

a pawl member disposed in said cutter adapter so as to be movable in a radial direction thereof to set a forward end of said pawl member to protrude and withdraw from an inner peripheral surface of said cutter adapter, said pawl member having an inclined engagement surface and an inclined guide surface both formed on said forward end of the pawl member and located respectively at a fore and a rear portion thereof in a direction in which said cutter body is fitted to said cutter adapter, and a means for biasing said pawl member in said radial direction to set said forward end thereof to protrude from said inner peripheral surface of said cutter adapter; and at least one pawl retracting means operable when said cutter body is fitted into said cutter adapter, whereby upon insertion of said at least one pawl retracting means into said at least one recessed portion, said at least one pawl retracting means comes into a pressure contact with the inclined guide surface of said pawl member, retracting said pawl member against said means for biasing, and whereby fitting said cutter body into said cutter adapter causes the outer peripheral portion of said cutter body to retract said pawl member and thereafter causes said pawl member to project into said at least one recessed portion, thereby clamping said cutter body onto said cutter adapter with said inclined engagement surface, and inserting said at least one pawl retracting means into said at least one recessed portion causes said pawl member to be retracted to release said clamping and to thereby permit said cutter body to be removed together with said at least one pawl retracting means from said cutter adapter.

14. The cutter changing system for the internal crankshaft fabricating miller type as set forth in claim 13, further comprising a raised annular cutter accepting seat formed on an inner peripheral surface of said cutter adapter and an annular indented portion formed on an outer peripheral surface of said cutter body and adapted to come into engagement with said said raised annular cutter accepting seat.

15. The cutter changing system for the internal crankshaft fabricating miller as set forth in claim 13, further comprising a first tapered spline formed in said inner peripheral surface of said cutter adapter and a second tapered spline formed in an outer peripheral surface of said cutter body and adapted to come into engagement with said first tapered spline.

16. A cutter changing system for an internal crankshaft fabricating miller in which a cutter body having tips attached thereto along an inner peripheral surface thereof is fitted with and fixed to a cutter adapter so as to be rotatable together with the cutter adapter about an axis, thereby permitting a workpiece to be machined therewith by milling to fabricate a crankshaft, the cutter changing system comprising:

at least one recessed portion formed in an outer peripheral portion of said cutter body; and at least one clamping means including:

a pawl member disposed in said cutter adapter so as to be movable in a radial direction thereof to set a forward end of said pawl member to protrude and withdraw from an inner peripheral surface of said cutter adapter, said pawl member having an inclined engagement surface and an inclined guide surface both formed on said forward end of the pawl member and located respectively at a fore and a rear portion thereof in a direction in which said cutter body is fitted to said cutter adapter, and a means for biasing said pawl member in said radial direction to set said forward end thereof to protrude from said inner peripheral surface of said cutter adapter; whereby fitting said cutter body into said cutter adapter causes the outer peripheral portion of said cutter body to retract said pawl member and thereafter causes said pawl member to project into said at least one recessed portion, thereby clamping said cutter body onto said cutter adapter with said inclined engagement surface.

17. The cutter changing system for the internal crankshaft fabricating miller as set forth in claim 16, further comprising a raised annular cutter accepting seat formed on an inner peripheral surface of said cutter adapter and an annular indented portion formed on an outer peripheral surface of said cutter body and adapted to come into engagement with said raised annular cutter accepting seat.

18. The cutter changing system for the internal crankshaft fabricating miller as set forth in claim 16, further comprising a first tapered spline formed in said inner peripheral surface of said cutter adapter and a second tapered spline formed in an outer peripheral surface of said cutter body and adapted to come into engagement with said first tapered spline.

* * * * *